(12) United States Patent
Mihota et al.

(10) Patent No.: US 9,007,981 B2
(45) Date of Patent: Apr. 14, 2015

(54) ELECTRONIC DEVICE, SIGNAL TRANSMISSION DEVICE, AND SIGNAL TRANSMISSION METHOD

(75) Inventors: Norihito Mihota, Saitama (JP);
Hirofumi Kawamura, Chiba (JP);
Yasuhiro Okada, Tokyo (JP); Naoto Nakamura, Kanagawa (JP); Yoshiyuki Akiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 527 days.

(21) Appl. No.: 13/384,120

(22) PCT Filed: Aug. 9, 2010

(86) PCT No.: PCT/JP2010/063485
§ 371 (c)(1),
(2), (4) Date: Jan. 13, 2012

(87) PCT Pub. No.: WO2011/019017
PCT Pub. Date: Feb. 17, 2011

(65) Prior Publication Data
US 2012/0120862 A1    May 17, 2012

(30) Foreign Application Priority Data

Aug. 13, 2009  (JP) ................................ 2009-187711
Aug. 2, 2010  (JP) ................................ 2010-173932

(51) Int. Cl.
*H04H 20/71* (2008.01)
*H04B 7/02* (2006.01)
*H04B 7/04* (2006.01)

(52) U.S. Cl.
CPC .............. *H04B 7/022* (2013.01); *H04B 7/0413* (2013.01)

(58) Field of Classification Search
CPC ......... H04B 7/022; H04B 7/00; H04B 7/0413
See application file for complete search history.

(56) References Cited

U.S. PATENT DOCUMENTS 5,754,948 A     5/1998  Metze
6,492,897 B1 *  12/2002  Mowery, Jr. .................. 455/522
(Continued)

FOREIGN PATENT DOCUMENTS

CN       1140365 A      1/1997
JP       10-256478      9/1998
(Continued)

OTHER PUBLICATIONS

International Search Report dated Sep. 21, 2010.
(Continued)

*Primary Examiner* — Phirin Sam
(74) *Attorney, Agent, or Firm* — Dentons US LLP

(57) ABSTRACT

Signal distribution, signal switching, and signal collection are performed with a simple configuration. An electronic device comprises a transmission unit (108) for transmitting, as a wireless signal, a signal to be transmitted and a reception unit (208) for receiving the wireless signal transmitted from the transmission unit. In the electronic device, a plurality of pairs of wireless signal transmission points in the transmission unit and wireless signal reception points in the reception unit can be formed. Using the pairs of transmission points and reception points make it possible to execute at least either one of signal distribution in which the same signal to be transmitted from a transmission point is transmitted to the multiple reception points and signal switching in which a signal to be transmitted from a transmission point is selectively transmitted to any of the multiple reception points. The signal to be transmitted is transmitted as a wireless signal. In this case, the signal distribution, signal switching, and signal collection are performed in a wireless signal portion. Since a portion where a signal transmission is performed through electric wiring does not interpose the portion where the signal distribution, signal switching, and signal collection are performed, the signal distribution, signal switching, and signal collection can be performed with a simple configuration.

15 Claims, 22 Drawing Sheets

(56) References Cited

U.S. PATENT DOCUMENTS

| | | |
|---|---|---|
| 2005/0158010 A1 | 7/2005 | Ikeda et al. |
| 2005/0162338 A1 | 7/2005 | Ikeda et al. |
| 2006/0271562 A1* | 11/2006 | Kato .............................. 707/10 |
| 2008/0151121 A1* | 6/2008 | Mochizuki et al. ........... 348/607 |
| 2009/0018773 A1* | 1/2009 | Niva et al. ..................... 701/300 |
| 2009/0028177 A1* | 1/2009 | Pettus et al. ................... 370/463 |
| 2009/0076659 A1* | 3/2009 | Ensworth et al. ............. 700/284 |
| 2010/0272160 A1* | 10/2010 | Bar-Ness et al. ............. 375/147 |

FOREIGN PATENT DOCUMENTS

| | | |
|---|---|---|
| JP | 2005-204221 | 7/2005 |
| JP | 2005-223411 | 8/2005 |
| JP | 2006-268059 | 10/2006 |

OTHER PUBLICATIONS

Chinese Office Action issued in connection with Chinese Patent Application No. CN 201080034609.0 dated Oct. 31, 2013.

* cited by examiner

FIG.5
(A)
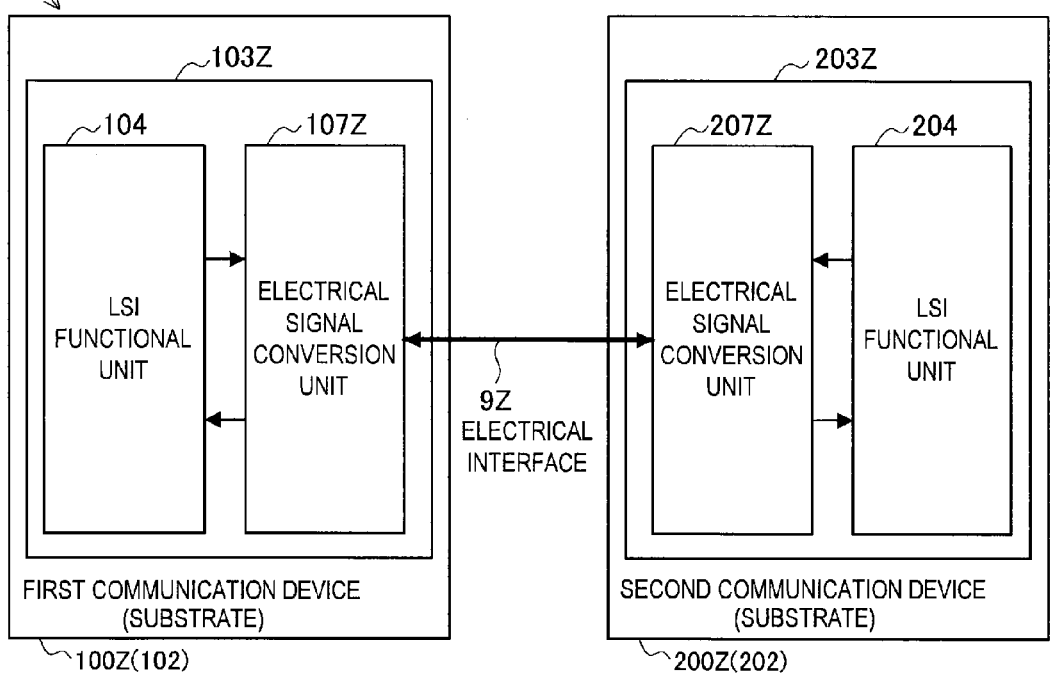
(B)
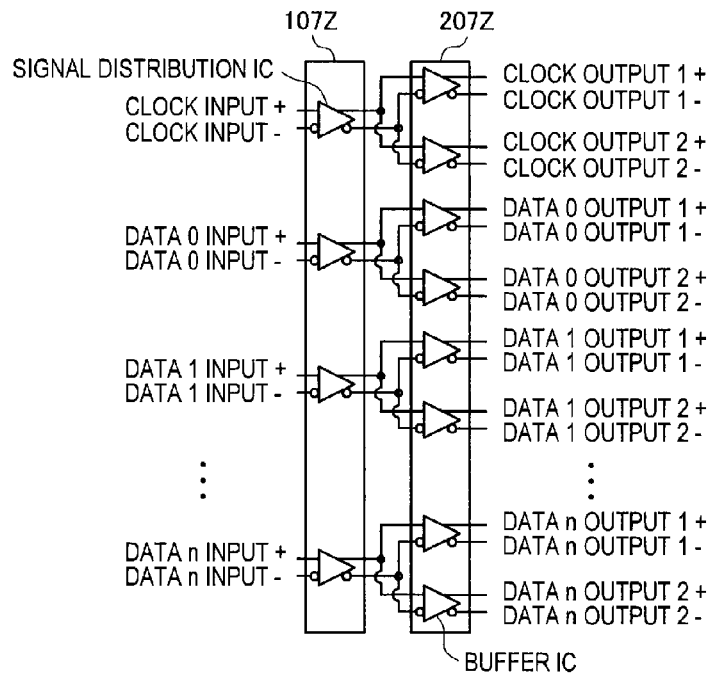

DIRECTIVITY OF DIPOLE ANTENNA

FIG.11
< SPACE DIVISION MULTIPLEXING >
(A) RELATIONSHIP BETWEEN TRANSMISSION-RECEPTION
DISTANCE AND PROPAGATION LOSS
$$L[dB] = 10\log_{10}((4\pi d/\lambda)^2) \quad \ldots(A)$$
L: PROPAGATION LOSS
d: DISTANCE BETWEEN TWO (TRANSMISSION AND RECEPTION)
$\lambda$: WAVELENGTH
$$d_2/d_1) = 10^{(DU/20)} \quad \ldots(B)$$
(B)
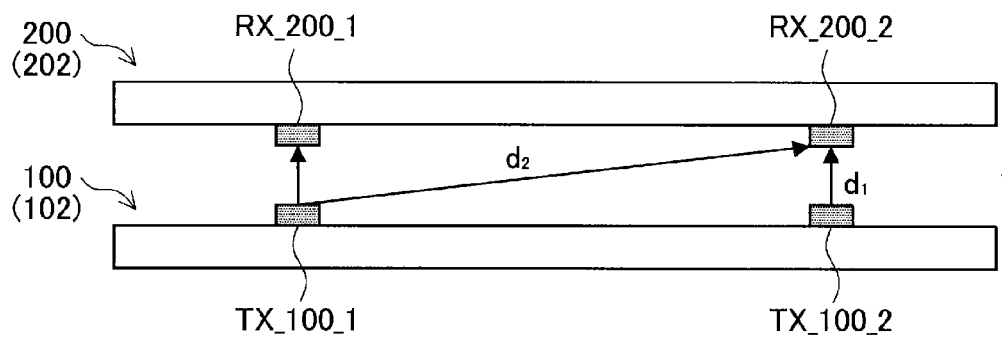
(C)
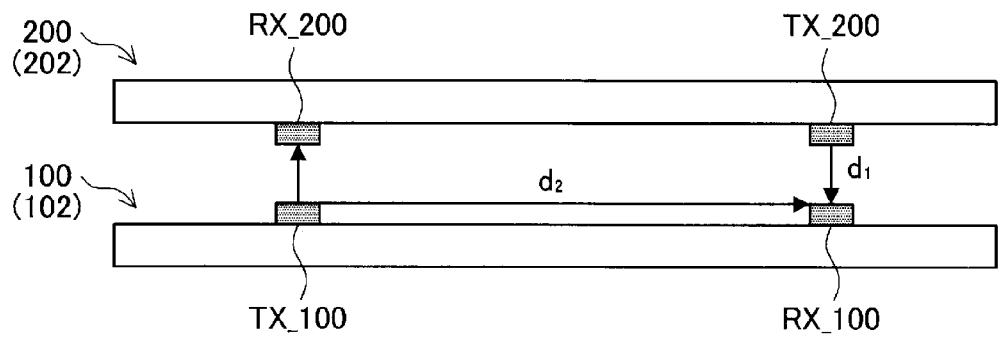

FIG.20
< EMBODIMENT 11: ELECTRONIC DEVICE (FIRST EXAMPLE) >
(A)
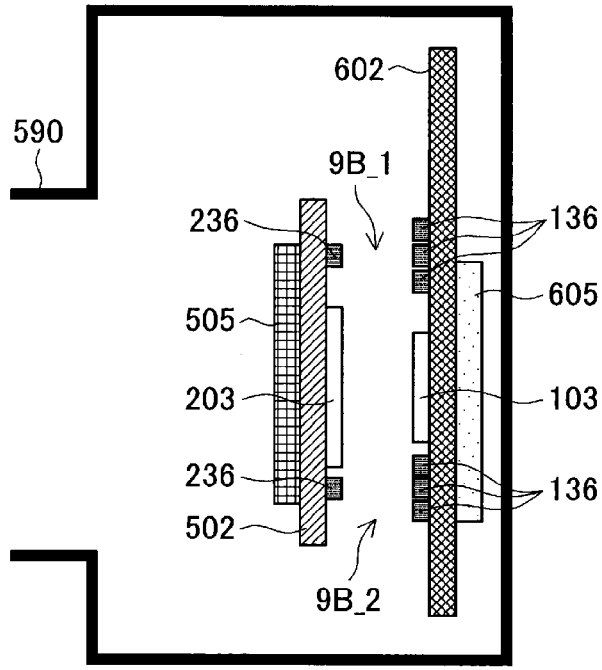
(B)
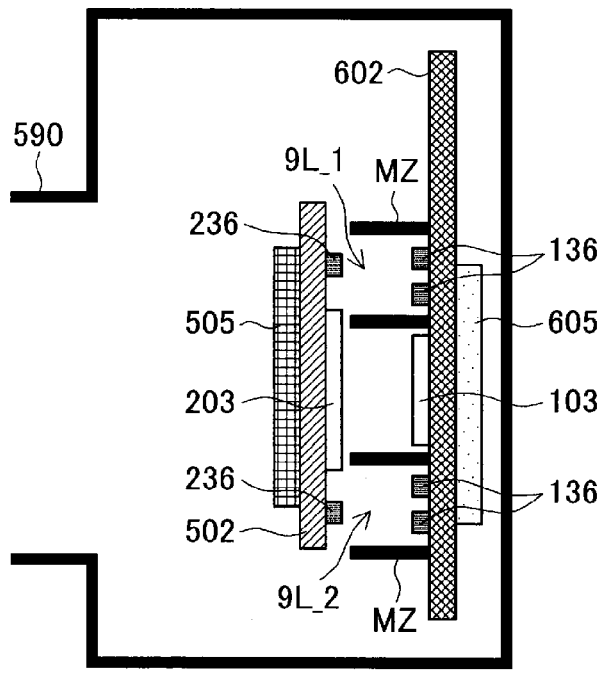

FIG.21
< EMBODIMENT 11: ELECTRONIC DEVICE (SECOND EXAMPLE) >
(A) MEMORY CARD
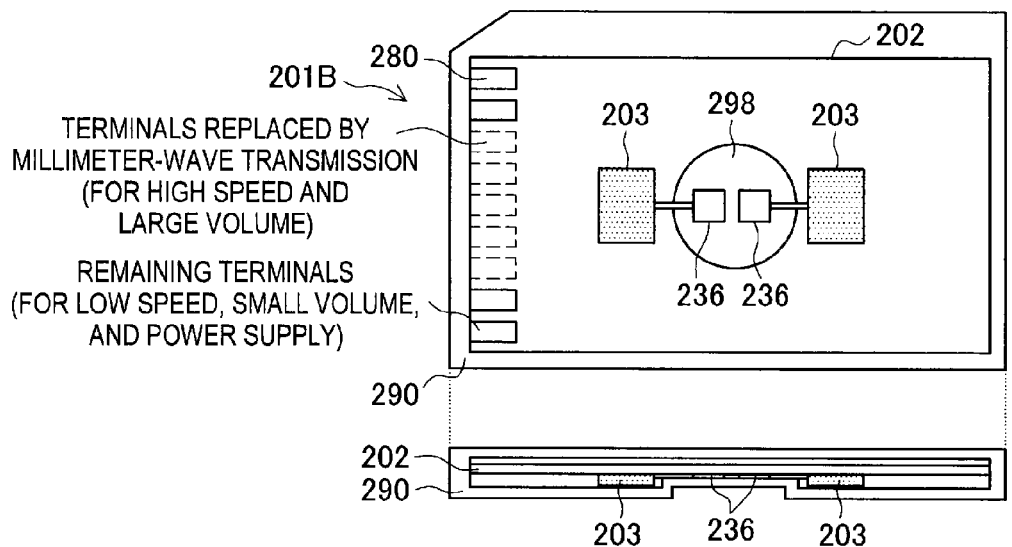
(B) ELECTRONIC DEVICE (SLOT STRUCTURE)
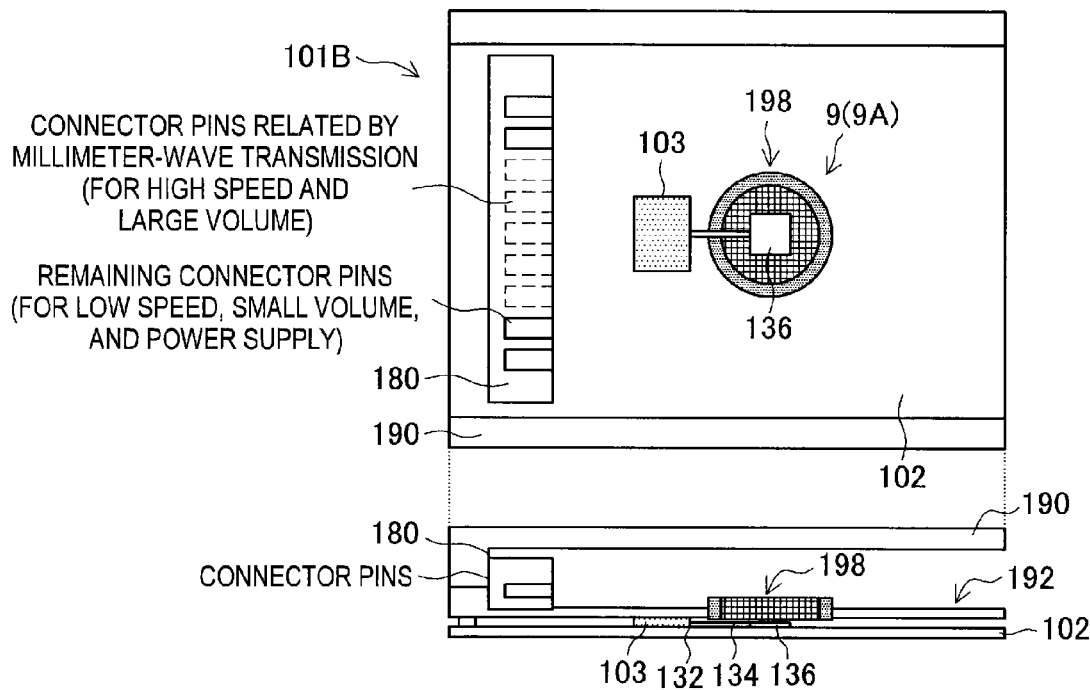
(C) ATTACHED STATE
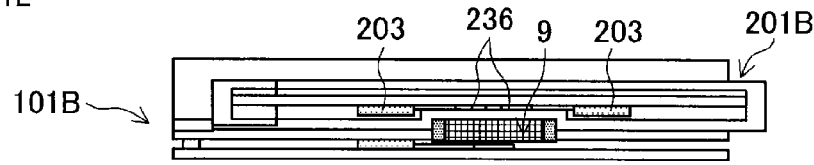

FIG.22
< EMBODIMENT 11: ELECTRONIC DEVICE (THIRD EXAMPLE) >
(A) IMAGE REPRODUCING DEVICE 201K
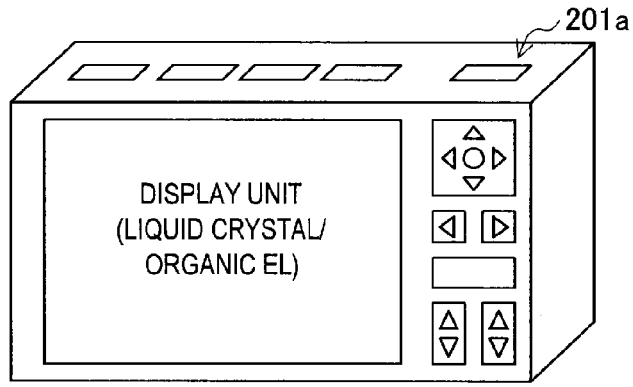
(B) IMAGE ACQUISITION UNIT 101K
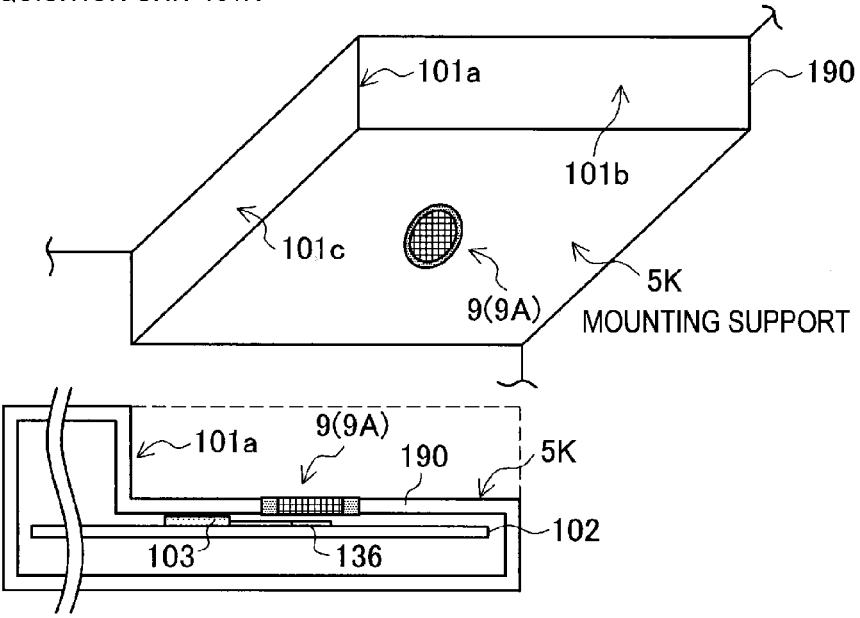
(C) MOUNTED STATE
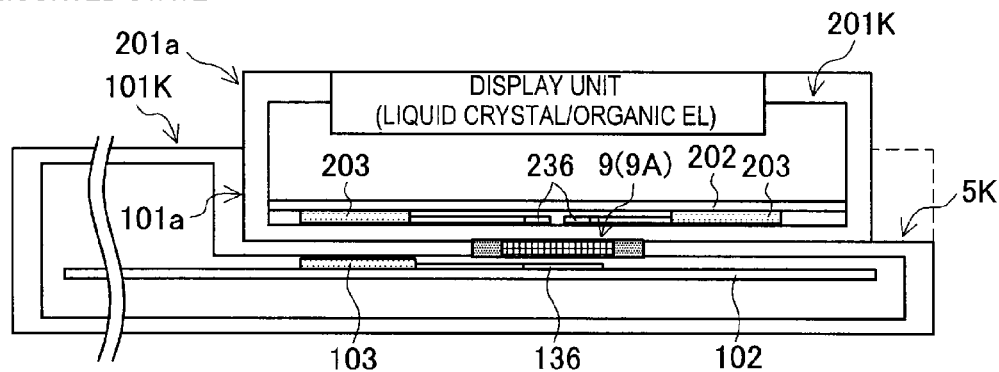

ELECTRONIC DEVICE, SIGNAL TRANSMISSION DEVICE, AND SIGNAL TRANSMISSION METHOD

TECHNICAL FIELD

The present invention relates to an electronic device, a signal transmission device, and a signal transmission method. More specifically, the present invention relates to signal distribution and switching and signal collection (aggregation).

BACKGROUND ART

As a method for realizing high-speed signal transmission within a single electronic device or between electronic devices arranged with a relatively short distance (e.g., within several centimeters or ten-odd centimeters) therebetween, LVDS (Low Voltage Differential Signaling) is known, for example. However, with a recent further increase in the volume and speed of transmission data, the following problems would arise: increased power consumption, increased influence of signal distortion due to reflections and the like, increased unwanted radiation, and the like. For example, when video signals (including image signals) or signals of computer images or the like are transmitted at high speed (in real time) within a device, LVDS has been reaching its limit.

In order to cope with the problems with the increased speed of transmission data, there is a method of increasing the number of wires and parallelizing signals to reduce the transmission rate per signal line. However, this could result in an increased number of input/output terminals. Consequently, it is required to make a printed board or cable wires more complex, increase the semiconductor chip size, and the like. Further, when high-speed, large-volume data is routed using wires, a problem of so-called electromagnetic field disturbance would arise.

All of the problems with the LVDS and the method of increasing the number of wires are attributable to the transmission of signals by electrical wires. Therefore, as a method for solving the problems attributable to the transmission of signals by electrical wires, a method of making electrical wires wireless for transmission is proposed.

For example, JP 2005-204221A and JP 2005-223411A each propose performing wireless signal transmission within a housing and adopting a UWB (Ultra Wide Band) communication method. The UWB communication method described in the two patent literatures uses a low carrier frequency and thus is not suitable for high-speed communication for transmitting video signals, for example. In addition, there is a problem in size such as an increased antenna size. Further, as the frequency used for transmission is close to the frequency of the other baseband signal processing, there is a problem in that interference is likely to occur between a wireless signal and a baseband signal. Furthermore, when the carrier frequency is low, it will be more susceptible to the influence of noise of a drive system within the device. Thus, measures against it should be taken.

In contrast, JP H10-256478A and U.S. Pat. No. 5,754,948A each describe using a carrier frequency of a millimeter-wave band. As described in the two patent literatures, when a carrier frequency of a millimeter-wave band with a shorter wavelength is used, the problems of the antenna size and the influence of noise of a drive system could be solved.

Citation List
Patent Literature

| Patent Literature 1: | JP 2005-204221A |
| Patent Literature 2: | JP 2005-223411A |
| Patent Literature 3: | JP H10-256478A |
| Patent Literature 4: | US 575494A |

SUMMARY OF INVENTION

Technical Problem

By the way, in electrical signal transmission, any of the following may be performed depending on applications: signal distribution in which identical signals are transmitted to a plurality of portions, signal switching in which a single signal is transmitted to any of a plurality of portions, and signal collection (aggregation) in which signals are transmitted such that signals from a plurality portions are collected into a single portion. In order to realize these, a circuit called a divider, an analog switch, or the like is used, but this could further increase the difficulty of the design of electrical wires (including patterns on a printed wiring board), which could result in a problem of an increased number of circuits and peripheral components as well as an increased number of wires. Taking measures against this could also result in a problem that the circuits become more complex.

In view of the foregoing, it is an object to provide an invention that can perform signal distribution, signal switching, and signal collection with a simpler configuration.

Solution to Problem

In a signal transmission device according to a first aspect of the present invention, a preceding-stage signal processing unit that performs predetermined signal processing on a signal to be transmitted, a modulation unit that modulates a processed signal output from the preceding-stage signal processing unit, a transmission unit that transmits the signal modulated by the modulation unit as a wireless signal, a reception unit that receives the wireless signal transmitted from the transmission unit, a demodulation unit that demodulates the signal received by the reception unit, and a rear-stage signal processing unity that performs predetermined signal processing on the signal demodulated by the demodulation unit are arranged at predetermined positions within a housing. A wireless signal transmission channel that allows radio transmission is formed between a wireless signal transmission point in the transmission unit and a wireless signal reception point in the reception unit, and a plurality of communication channels can be formed between a transmission point(s) and a reception point(s) within the single wireless signal transmission channel. Thus, at least one of the following is executable: signal distribution in which identical signals to be transmitted are distributed to a plurality of reception units by transmitting identical wireless signals transmitted from a single transmission point to a plurality of reception points using the plurality of communication channels, signal switching in which a destination of a signal to be transmitted is switched using the plurality of communication channels, or signal collection in which a plurality of signals to be transmitted are collected into a single reception unit by transmitting respective wireless signals transmitted from a plurality of transmission points to a single reception point using the respective communication channels.

A signal transmission method according to a second aspect of the present invention allows a plurality of communication channels to be formed between a wireless signal transmission point(s) in a transmission unit that transmits as a wireless signal a signal obtained by processing a signal to be transmitted and a wireless signal reception point(s) in a reception unit that receives the wireless signal transmitted from the transmission unit. Thus, at least one of the following is executed: signal distribution in which identical signals to be transmitted are distributed to a plurality of reception units by transmitting identical wireless signals transmitted from a single transmission point to a plurality of reception points using the plurality of communication channels, signal switching in which a destination of a signal to be transmitted is switched using the plurality of communication channels, or signal collection in which a plurality of signals to be transmitted are collected into a single reception unit by transmitting respective wireless signals transmitted from a plurality of transmission points to a single reception point using the respective communication channels.

An electronic device according to a third aspect of the present invention is an electronic device that applies the signal transmission device according to the first aspect of the present invention and the "signal distribution" in the signal transmission method according to the second aspect of the present invention described above. An electronic device according to a fourth aspect of the present invention is an electronic device that applies the signal transmission device according to the first aspect of the present invention and the "signal switching" in the signal transmission method according to the second aspect of the present invention described above. An electronic device according to a fifth aspect of the present invention is an electronic device that applies the signal transmission device according to the first aspect of the present invention and the "signal collection" in the signal transmission method according to the second aspect of the present invention described above.

Specifically, in each of the electronic device according to the third aspect, the electronic device according to the fourth aspect, and the electronic device according to the fifth aspect of the present invention, a transmission unit that transmits a signal to be transmitted as a wireless signal and a reception unit that receives the wireless signal transmitted from the transmission unit are arranged within the housing. A wireless signal transmission channel that allows radio transmission is formed between a wireless signal transmission point in the transmission unit and a wireless signal reception point in the reception unit, and a plurality of communication channels can be formed between a transmission point(s) and a reception point(s) within the single wireless signal transmission channel.

In the electronic device according to the third aspect of the present invention, identical wireless signals transmitted from a single transmission point are transmitted to a plurality of reception points using the plurality of communication channels, whereby signal distribution in which identical signals to be transmitted are distributed to a plurality of reception units can be executed.

In the electronic device according to the fourth aspect of the present invention, signal switching in which a destination of a signal to be transmitted is switched using the plurality of communication channels can be executed.

In the electronic device according to the fifth aspect of the present invention, respective wireless signals transmitted from a plurality of transmission points are transmitted to a single reception point using the respective communication channels, whereby signal collection in which a plurality of signals to be transmitted are collected into a signal reception unit can be executed.

Each of the electronic devices recited in the dependent claims of the electronic devices according to the third aspect, the fourth aspect, and the fifth aspect of the present invention defines a further advantageous specific example of the electronic device according to each of the third aspect, the fourth aspect, and the fifth aspect of the present invention. In addition, various technologies and methods applied to each of the electronic devices recited in the dependent claims of the electronic devices according to the third aspect, the fourth aspect, and the fifth aspect of the present invention can be similarly applied to each of the signal transmission device according to the first aspect of the present invention and the signal transmission method according to the second aspect of the present invention.

In each of the first to fifth aspects of the present invention, signals to be transmitted are transmitted as wireless signals. In this case, signal distribution, signal switching, or signal collection is realized using wireless signals via the plurality of communication channels. As a portion where electrical wire signal transmission is performed is not provided at the portion where the signal distribution, signal switching, or signal collection is realized, the signal distribution, signal switching, or signal switching can be performed with a simple configuration.

Advantageous Effects of Invention

According to the present invention, signal distribution, signal switching, and signal collection can be performed with a simple configuration.

BRIEF DESCRIPTION OF DRAWINGS

FIG. 5(A) and FIG. 5(B) are diagrams each describing a signal interface of a signal transmission device of a comparative example from the aspect of a functional configuration.

FIG. 11A to FIG. 11C are diagrams each describing the concept of space division multiplexing adopted in Embodiment 2.

FIG. 20(A) and FIG. 20(B) are diagrams each describing a first example of an electronic device of Embodiment 11.
FIG. 21(A) to FIG. 21(C) are diagrams each describing a second example of an electronic device of Embodiment 11.
FIG. 22(A) to FIG. 22(C) are diagrams each describing a third example of an electronic device of Embodiment 11.

DESCRIPTION OF EMBODIMENTS

Figure 1:
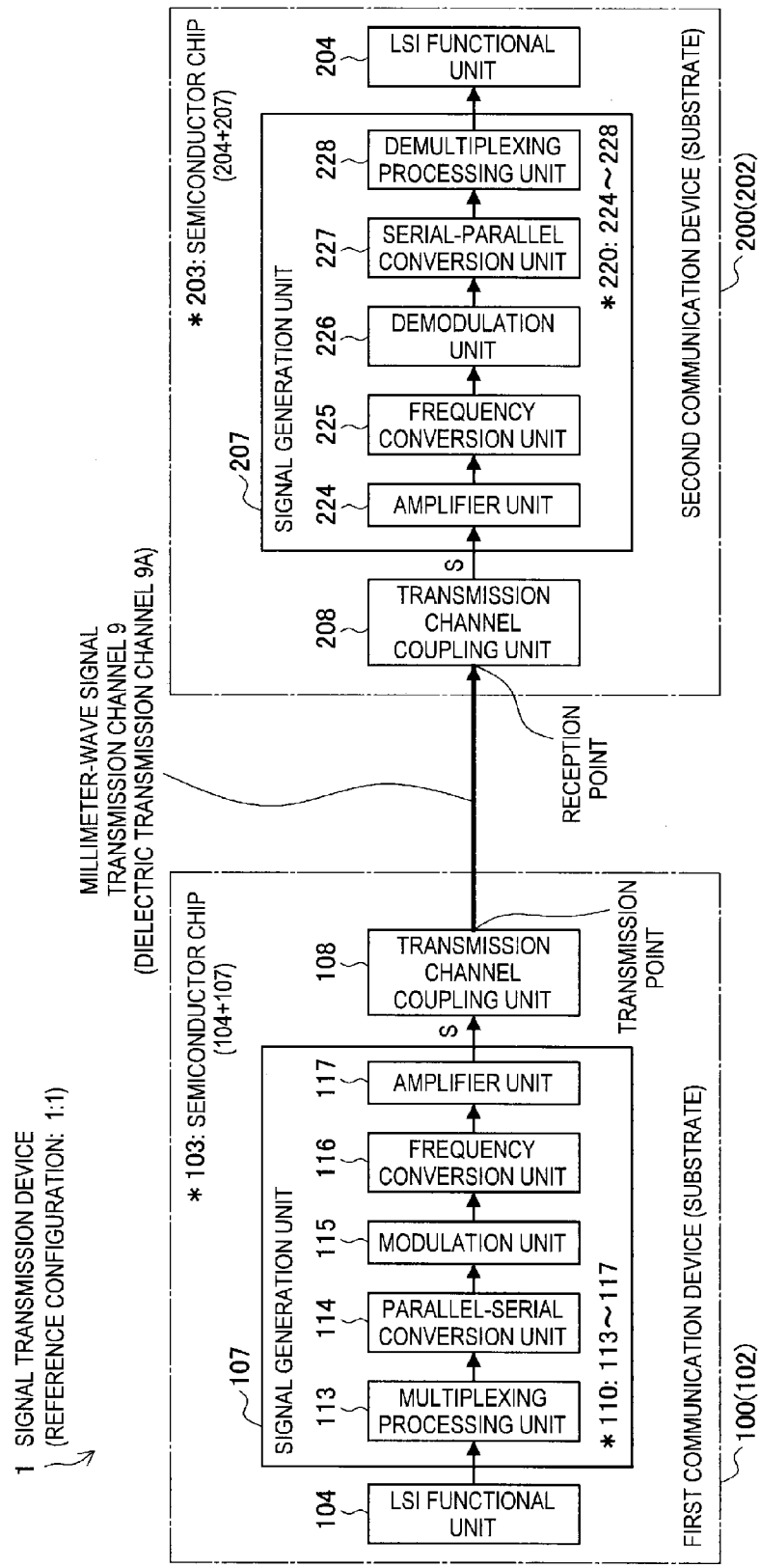
FIG. 1 is a diagram of a reference configuration describing a signal interface of a signal transmission device of this embodiment from the aspect of a functional configuration.

Hereinafter, embodiments of the present invention will be described in detail with reference to the drawings. The description will be given in the following order.
1. Outline of the Entirety
2. Communication Processing System: Reference Configuration
3. Communication Processing System: Basic Configuration 1 to Basic Configuration 3
4. Embodiment 1: Exemplary Application of the First Basic Configuration
5. Embodiment 2: Adoption of Space Division Multiplexing
6. Embodiment 3: Generation of a Single Signal on the Reception Side on the basis of a Plurality of Signals
7. Embodiment 4: a Plurality of Methods for Processing Signals Acquired by a Single Electronic Device on the Reception Side
8. Embodiment 5: Signal Switching by Relative Movement between Transmitter and Receiver→Application to a Rotating Structure
9. Variations: Embodiment 6 to Embodiment 10 (Variations of Embodiment 1 to Embodiment 5)
10. Embodiment 11: Example of Application to Electronic Devices
<Outline of the Entirety>
Radio Transmission Device, Radio Transmission Method In a first configuration of this embodiment, which corresponds to the first aspect and the second aspect of the present invention, a radio transmission device is structured by having at least one of a transmission unit (e.g., a transmission channel coupling unit on the transmission side) or a reception unit (e.g., a transmission channel coupling unit on the reception side). The transmission unit transmits a signal to be transmitted as a wireless signal. The reception unit receives the wireless signal transmitted from the transmission unit. At least one of the preceding stage of the transmission unit or the rear stage of the reception unit further includes a signal processing unit. The signal processing unit performs predetermined signal processing. For example, a preceding-stage signal processing unit that performs predetermined signal processing on a signal to be transmitted, and a modulation unit that modulates the processed signal output from the preceding-stage signal processing unit are provided on the transmission side. A demodulation unit that demodulates the signal received by the reception unit, and a rear-stage signal processing unit that performs predetermined signal processing on the signal demodulated by the demodulation unit are provided on the reception side. A plurality of communication channels can be formed between a wireless signal transmission point(s) in the transmission unit and a wireless signal reception point(s) in the reception unit, so that at least one of the following is executable: signal distribution in which identical signals to be transmitted are distributed to a plurality of reception units by transmitting identical wireless signals transmitted from a single transmission point to a plurality of reception points using the plurality of communication channels, signal switching in which the destination of a signal to be transmitted is switched using the plurality of communication channels, or signal collection in which a plurality of signals to be transmitted are collected into a single reception unit by transmitting respective wireless signals transmitted from a plurality of transmission points to a single reception unit using the respective communication channels.

When represented by "the number of transmission points": "the number of reception points," the basic configuration for performing signal distribution, signal switching, or signal collection can adopt any of a "1:N configuration," an "M:1 configuration," or an "M:N configuration."

For example, as a first basic configuration for performing signal distribution, a so-called "1:N configuration" can be adopted in which a plurality of reception points are arranged relative to a single transmission point. That is, arranging a plurality of reception points relative to a single transmission point allows a plurality of communication channels to be arranged between the transmission point and the reception points. Then, signal distribution is made executable in which signals to be transmitted that have been transmitted from the single transmission point are transmitted to the plurality of reception points.

As a second basic configuration for performing signal distribution, a so-called "M:N configuration" can be adopted in which a plurality of reception points are arranged relative to a plurality of transmission points. That is, arranging a plurality of reception points relative to a plurality of transmission points allows a plurality of communication channels to be arranged between the transmission points and the reception points. Then, signal distribution is made executable in which identical signals to be transmitted that have been transmitted from any of the plurality of transmission points are transmitted to the plurality of reception points.

As a first basic configuration for performing signal switching, a so-called "1:N configuration" can be adopted in which a plurality of reception points are arranged relative to a single transmission point. That is, arranging a plurality of reception points relative to a single transmission point allows a plurality of communication channels to be arranged between the transmission point and the reception points. Then, signal switching is made executable in which a signal to be transmitted that has been transmitted from the single transmission point is selectively transmitted to any of the plurality of reception points.

As a second basic configuration for performing signal switching, a so-called "M:1 configuration" can be adopted in which a single reception point is arranged relative to a plurality of transmission points. That is, arranging a single reception point relative to a plurality of transmission points allows a plurality of communication channels to be arranged between the transmission points and the reception point. Then, signal switching is made executable in which a signal to be transmitted that has been transmitted from any of the plurality of transmission points is selectively transmitted to the single reception point.

As a third basic configuration for performing signal switching, a so-called "M:N configuration" can be adopted in which a plurality of reception points are arranged relative to a plurality of transmission points. That is, arranging a plurality of reception points relative to a plurality of transmission points allows a plurality of communication channels to be arranged between the transmission points and the reception points. Then, signal switching is made executable in which a signal to be transmitted that has been transmitted from any of the plurality of transmission points is selectively transmitted to any of the plurality of reception points.

As a first basic configuration for performing signal collection, a so-called "M:1 configuration" can be adopted in which a single reception point is arranged relative to a plurality of transmission points. That is, arranging a single reception point relative to a plurality of transmission points allows a plurality of communication channels to be arranged between the transmission points and the reception point. Then, signal collection is made executable in which signals to be transmitted that have been transmitted from the plurality of transmission points are collected into the single reception point.

As a second basic configuration for performing signal collection, a so-called "M:N configuration" can be adopted in which a plurality of reception points are arranged relative to a plurality of transmission points. That is, arranging a plurality of reception points relative to a plurality of transmission points allows a plurality of communication channels to be arranged between the transmission points and the reception points. Then, signal collection is made executable in which, regarding at least one of the plurality of reception points, signals to be transmitted that have been transmitted from the plurality of transmission points are collected into a single reception point.

In any case, the gap between the transmission point(s) and the reception point(s) (channel-to-channel distance: typically, antenna-to-antenna distance) is preferably set as follows so that signal transmissions are performed concurrently. That is, the gap between the transmission point(s) and the reception point(s) is set within the range that identical signals to be transmitted that have been transmitted from a transmission point can be concurrently received at a plurality of reception points, or the range that a plurality of signals to be transmitted can be received at a single reception point.

In addition, in any case, the transmission side preferably transmits information for identifying a reception point to receive a signal to be transmitted that has been transmitted from a transmission point, together with the signal to be transmitted. In addition, the reception side preferably controls whether or not to receive and demodulate the signal to be transmitted that has been transmitted from the transmission point on the basis of the information for identifying the reception point.

Further, in any case, the transmission point(s) and the reception point(s) can be configured to be movable relative to each other. Such a configuration can facilitate, when a plurality of electronic devices (e.g., solid-state imaging devices or data processing ICs) exist, switching between the electronic devices by moving an aerial on the transmission side or the reception side on the radio (electromagnetic-wave) transmission channel or by moving the electronic device on the transmission side or the reception side.

Furthermore, in any case, interference or crosstalk is preferably prevented by using the plurality of communication channels at different moments in time (timing) with time division multiplexing or by concurrently using the plurality of communication channels with a multiplexing method such as frequency division multiplexing or code-division multiplexing.

In order to apply space division multiplexing, for example, the wireless signal transmission channel between the transmission point and the reception point is preferably designed to have a structure in which a wireless signal is transmitted while being confined within the transmission channel. Alternatively, the wireless signal transmission channel between the transmission point and the reception point is preferably designed as a free space that does not have a structure in which a wireless signal is transmitted while being confined within the transmission channel, and the distance between an adjacent pair of a transmission point and a reception point allows independent communication to be performed between the adjacent pair (i.e., to avoid interference or crosstalk).

Preferably, an additional transmission point and reception point are able to be arranged within the transmission coverage. For example, a space and a structure for inserting a transmission antenna or a reception antenna are preferably provided to a radio transmission channel located between a combination of a radio transmitter and an aerial on the transmission side and a combination of a radio receiver and an aerial on the reception side so that signal transmission can also be performed between the other radio transmitter and radio receiver added by the insertion of the antenna.

Preferably, a plurality of wireless signal transmission points in the transmission unit and a plurality of wireless signal reception points in the reception unit, which can be paired, are provided so that signal processing is performed using a signal acquired by each pair. For example, a single signal is preferably generated using a signal acquired by each pair.

Preferably, a plurality of wireless signal transmission points in the transmission unit and a plurality of wireless signal reception points in the reception unit, which can be paired, are provided so that signal distribution, signal switching, or signal collection is performed in each pair. For example, a signal with a different property is preferably acquired by performing signal processing with a different property on the basis of wireless signals radiated from the identical transmission point.

(Electronic Device)

According to an electronic device of this embodiment, which corresponds to the third aspect of the present invention, the fourth aspect of the present invention, and the fifth embodiment of the present invention, a single electronic device may be constructed with a device configuration in which each unit is accommodated within a single housing. Alternatively, a combination of a plurality of devices (electronic devices) may constitute the entirety of a single electronic device. A signal transmission device (a radio transmission device) of this embodiment is used for an electronic device such as, for example, a digital recording/reproducing device, a terrestrial television receiver device, a portable telephone device, a game machine, or a computer.

In the following description of the signal transmission device of this embodiment, a carrier frequency of a millimeter-wave band (wavelengths of 1 to 10 mm) is used. However, the carrier frequency is not limited to the millimeter-wave band, and this embodiment can also be applied to a case where a submillimeter-wave band with a shorter wavelength, or a carrier frequency around the millimeter-wave band is used, for example.

When constructing a signal transmission device, the signal transmission device may have only a transmission side, only a reception side, or both the transmission side and the reception side. The transmission side and the reception side are coupled together via a wireless signal transmission channel (e.g., a millimeter-wave signal transmission channel). A signal to be transmitted is transmitted after being converted in frequency into a millimeter-wave band that is suitable for wide band transmission. For example, a first communication unit (a first millimeter-wave transmission device) and a second communication unit (a second millimeter-wave transmission device) constitute a signal transmission device. Between the first communication unit and the second communication unit arranged with a relatively short distance therebetween, a signal to be transmitted is converted into a millimeter-wave signal, and then the millimeter-wave signal is transmitted via the millimeter-wave signal transmission channel. The "radio transmission" in this embodiment means that a signal to be transmitted is transmitted not by a typical electrical wire (a simple wire cable) but by radio (in this example, a millimeter wave).

The "relatively short distance" means that the distance is shorter than the distance between communication devices used for broadcast or typical radio communication outdoors (outside), and it is acceptable as long as the transmission coverage can be substantially identified as a closed space. The "closed space" means a space having little leakage of radio waves from the inside of the space to the outside, and having few arrival (intrusion) of radio waves from the outside to the inside of the space, and typically means a state in which the entire space is surrounded by a housing (case) having a shielding effect against radio waves. For example, the "closed space" corresponds to communication between substrates within a housing of a single electronic device, communication between chips on a single substrate, or communication between devices in a state in which a plurality of electronic devices are integrated as in a state in which one electronic device is mounted on the other electronic device. The term "integrated" is typically exemplified by a state in which two electronic devices are entirely in contact with each other by mounting, but it is acceptable as long as the transmission coverage between two electronic devices can be substantially identified as a closed space. For example, it includes a case where two electronic devices are arranged apart from each other more or less, with a relatively short distance therebetween, for example, several centimeters, ten-odd centimeters, or the like and thus the two electronic devices can be regarded as being "substantially" integral. In sum, it is acceptable as long as two electronic devices are in a state in which there is little leakage of radio waves from the inside of the space, through which radio waves formed by the two electronic devices can propagate, to the outside and there is also few arrival (intrusion) of radio waves from the outside to the inside of the space.

Hereinafter, signal transmission performed within a housing of a single electronic device will be referred to as in-housing signal transmission, and signal transmission performed in a state in which a plurality of electronic devices are integrated (hereinafter, "substantially integrated" is also included) will be referred to as inter-device signal communication. In the case of in-housing signal transmission, a signal transmission device, which includes a communication device on the transmission side (a communication unit: a transmission unit) and a communication device on the reception side (a communication unit: a reception unit) accommodated within the same housing and also includes a wireless signal transmission channel formed between the communication units (the transmission unit and the reception unit), serves as an electronic device. Meanwhile, in the case of inter-device signal transmission, a signal transmission device is constructed such that a communication device on the transmission side (a communication unit: a transmission unit) and a communication device on the reception side (a communication unit: a reception unit) are accommodated within housings of different electronic devices, and a wireless signal transmission channel is formed between the communication units (the transmission unit and the reception unit) of the two electronic devices when the two electronic devices are arranged at predetermined positions and are integrated.

Each communication device having a millimeter-wave signal transmission channel interposed therebetween is arranged such that a transmission system and a reception system are paired. When each communication device is provided with both a transmission system and a reception system, two-way communication becomes possible. When each communication device is provided with both a transmission system and a reception system, signal transmission between one communication device and the other communication device can be performed either in one way (a single direction) or two ways. For example, when the first communication unit is the transmission side and the second communication unit is the reception side, a transmission unit is arranged in the first communication unit and a reception unit is arranged in the second communication unit. When the second communication unit is the transmission side and the first communication unit is the reception side, a transmission unit is arranged in the second communication unit and a reception unit is arranged in the first communication unit.

The transmission unit includes, for example, a signal generation unit on the transmission side that performs signal processing on a signal to be transmitted to generate a millimeter-wave signal (a signal conversion unit that converts an electrical signal to be transmitted into a millimeter-wave signal), and a signal coupling unit on the transmission side that couples the millimeter-wave signal generated by the signal generation unit on the transmission side to the transmission channel that transmits the millimeter-wave signal (the millimeter-wave signal transmission channel). Preferably, the signal generation unit on the transmission side is integrated with a functional unit that generates a signal to be transmitted.

For example, the signal generation unit on the transmission side has a modulation circuit, and the modulation circuit modulates the signal to be transmitted. The signal generation unit on the transmission side converts the frequency of the signal, which has been modulated by the modulation circuit, to generate a millimeter-wave signal. In principle, the signal to be transmitted can be converted directly into a millimeter-wave signal. The signal coupling unit on the transmission side supplies the millimeter-wave signal generated by the signal generation unit on the transmission side to the millimeter-wave signal transmission channel.

The reception unit includes, for example, a signal coupling unit on the reception side that receives the millimeter-wave signal transmitted via the millimeter-wave signal transmission channel, and a signal generation unit on the reception side that performs signal processing on the millimeter-wave signal (the input signal) received by the signal coupling unit on the reception side to generate a normal electrical signal (a signal to be transmitted) (a signal conversion unit that converts the millimeter-wave signal into an electrical signal to be transmitted). Preferably, the signal generation unit on the reception side is integrated with a functional unit that receives a signal to be transmitted. For example, the signal generation unit on the reception side has a demodulation circuit, and converts the frequency of the millimeter-wave signal to generate an output signal, and then the demodulation circuit demodulates the output signal to generate a signal to be transmitted. In principle, the millimeter-wave signal can be converted directly into a signal to be transmitted.

That is, in interfacing a signal, a signal to be transmitted is transmitted using a millimeter-wave signal without a contact node or a cable (i.e., not using an electrical wire). Preferably, at least signal transmission (in particular, video signals that are required to be transmitted at high speed and with a large volume, high-speed clock signals, or the like) is performed using a millimeter-wave signal. In sum, signal transmission, which has been conventionally performed using an electrical wire, is performed using a millimeter-wave signal in this embodiment. By performing signal transmission in a millimeter-wave band, it becomes possible to realize high-speed signal transmission on the order of Gbps, and easily restrict the coverage of millimeter-wave signals, and also obtain effects attributable to such performance.

Herein, it is acceptable as long as each signal coupling unit is configured such that the first communication unit and the second communication unit can transmit millimeter-wave signals via the millimeter-wave signal transmission channel. For example, each signal coupling unit may have an antenna structure (an antenna coupling unit) or have a coupling structure without having an antenna structure. A "millimeter-wave signal transmission channel that transmits a millimeter-wave signal" can be air (a so-called free space), but is preferably the one having a structure in which a millimeter-wave signal is transmitted while being confined within the transmission channel (referred to as a millimeter-wave confining structure or a wireless signal confining structure). By actively using such a millimeter-wave confining structure, it is possible to determine as appropriate routing of the millimeter-wave signal transmission channel like an electrical wire, for example. Such a millimeter-wave confining structure typically corresponds to a so-called waveguide, but the configuration is not limited thereto. For example, it is preferable to use the one formed of a dielectric material capable of transmitting millimeter-wave signals (referred to as a dielectric transmission channel or a transmission channel within a millimeter-wave dielectric body), or a hollow waveguide that forms a transmission channel and has a structure in which a shielding material for suppressing external radiation of millimeter-wave signals is provided such that it surrounds the transmission channel and the inside of the shielding material is hollow. By making the dielectric material or the shielding material to have flexibility, routing of the millimeter-wave signal transmission channel becomes possible. When the transmission channel is air (a so-called free space), each signal coupling unit has an antenna structure, and short-distance signal transmission through the air is performed with the antenna structure. Meanwhile, when the transmission channel is formed of a dielectric material, it can also have an antenna structure, but this is not essential.

(Comparison between Electrical Wire Signal Transmission and Radio Transmission)

Signal transmission in which signals are transmitted via electrical wires has the following problems.

i) Although an increase in the volume and speed of transmission data is demanded, there are restrictions on the transmission rate and transmission capacity of electrical wires.

ii) In order to cope with the problems with the increased speed of transmission data, there is a method of increasing the number of wires and parallelizing signals to reduce the transmission rate per signal line. However, this could result in an increased number of input/output terminals. Consequently, it is required to make a printed board or cable wires more complex, increase the physical size of a connector portion and an electrical interface, and the like, resulting in more complicated shapes, decreased reliability, increased cost, and the like.

iii) With an increase in the band of a baseband signal in accordance with an increased volume of information such as movie images or computer images, a problem of EMC (electromagnetic compatibility) has come to the surface. For example, when an electric wire is used, the wire serves as an antenna, and a signal corresponding to the tuning frequency of the antenna is interfered with. Further, reflections or resonance caused by impedance mismatch of the wire or the like could cause unwanted radiation. Taking a measure against such problems could also result in a more complicated configuration of the electronic device.

iv) Other than EMC, when there are reflections, problems of transmission errors due to inter-symbol interference on the reception side and transmission errors due to occurrence of disturbance would arise.

In contrast, when signal transmission is performed wirelessly (e.g., by using a millimeter-wave band) without using electrical wires, there is no need to care about the shapes of wires or the positions of connectors. Thus, there are few restrictions on the layout. As for signals that are replaced by millimeter-wave signal transmission, wires and terminals can be omitted. Thus, the problem of EMC can be eliminated. Typically, a communication device includes no other functional unit that uses the frequency of a millimeter-wave band. Thus, measures against EMC can be easily realized. As radio communication is performed in a state in which the communication device on the transmission side and the communication device on the reception side are located close to each other, and the signal transmission is performed between fixed positions or with a known positional relationship, the following advantages can be provided.

1) It is easy to properly design a propagation channel (a waveguide structure) between the transmission side and the reception side.

2) By designing a dielectric structure of the transmission channel coupling unit, which seals the transmission side and the reception side, together with the transmission channel (the waveguide structure of the millimeter-wave signal transmission channel), it becomes possible to perform high-reliability, excellent transmission through free-space transmission.

3) As it is not necessary to dynamically or adaptively control a controller that manages radio transmission, overhead of the control can be suppressed as compared to typical radio communication. Consequently, a set value (a so-called parameter) used for a control circuit, an arithmetic circuit, or the like can be set as a constant (a so-called fixed value), which allows size reduction, low power consumption, and high speed. For example, when the radio transmission properties are calibrated during the manufacture or design time and variations between individuals are grasped, the data can be referred to. Thus, a set value that defines the operation of the signal processing unit can be preset or be controlled statically. As the set value approximately properly defines the operation of the signal processing unit, high-quality communication can be performed with a simple configuration and low power consumption.

Further, by performing radio communication in a millimeter-wave band with a short wavelength, the following advantages can be provided.

a) As a millimeter-wave band secures a wide communication band, the date rate can be increased easily.

b) The frequency used for transmission can be away from the frequency of the other baseband signal processing, so that interference between the frequency of the millimeter wave and the frequency of the baseband signal is unlikely to occur.

c) As a millimeter wave has a short wavelength, the sizes of the antenna and the waveguide structure that are determined in accordance with the wavelength can be reduced. In addition, as a distance attenuation is large and diffraction is small, electromagnetic shielding is easy to perform.

d) For normal radio communication performed outdoors, there are severe restrictions on the stability of a carrier wave in order to prevent interference and the like. In order to realize such a carrier wave with high stability, high-stability external frequency reference components and multiply circuit, a PLL (phase locked loop circuit), and the like are used, resulting in increased circuit size. However, millimeter waves (when combined with signal transmission between fixed positions or with a known positional relationship, in particular) can be easily shielded and thus outside leakage thereof can be prevented. In order to demodulate a signal, which has been transmitted using a carrier wave with loosened stability, using a small circuit on the reception side, an injection lock method is preferably adopted.

For example, as a method that realizes high-speed signal transmission between electronic devices arranged with a relatively short distance (e.g., within ten-odd centimeters) therebetween or within an electronic device, LVDS (Low Voltage Differential Signaling) is known, for example. However, with a recent further increase in the volume and speed of transmission data, the following problems would arise: increased power consumption, increased influence of signal distortion due to reflections and the like, increased unwanted radiation (a problem of so-called EMI), and the like. For example, when video signals (including image signals) or signals of computer images or the like are transmitted at high speed (in real time) in a device or between devices, LVDS has been reaching its limit.

In order to cope with high-speed transmission of data, the number of wires may be increased and signals may be parallelized to reduce the transmission rate per signal line. However, this could result in an increased number of input/output terminals. Consequently, it is required to make a printed board or cable wires more complex, increase the semiconductor chip size, and the like. Further, when high-speed, large-volume data is routed using wires, a problem of so-called electromagnetic field disturbance would arise.

All of the problems with the LVDS and the method of increasing the number of wires are attributable to the transmission of signals by electrical wires. Therefore, as a method for solving the problems attributable to the transmission of signals by electrical wires, a method of making electrical wires wireless for transmission can be adopted. As a method of making electrical wires wireless for transmission, for example, it is possible to perform wireless signal transmission within a housing and also apply a UWB (Ultra Wide Band) communication method (referred to as a first method) or use a carrier frequency of a millimeter-wave band with a short wavelength (1 to 10 mm) (referred to as a second method). However, the UWB communication method of the first method, which uses a low carrier frequency, is not suitable for high-speed communication for transmitting video signals, for example, and has a problem in size such as an increased antenna size. Further, as the frequency used for transmission is close to the frequency of the other baseband signal processing, there is a problem in that interference is likely to occur between a wireless signal and a baseband signal. Furthermore, when the carrier frequency is low, it will be more susceptible to the influence of noise of a drive system within the device. Thus, measures against it should be taken. In contrast, when a carrier frequency of a millimeter-wave band with a shorter wavelength is used as in the second method, the problems of the antenna size and interference could be solved.

Heretofore, description has been made of a case where communication is performed in a millimeter-wave band. However, the application range is not limited to the communication in a millimeter-wave band. It is also possible to apply communication using a frequency band that is lower than the millimeter-wave band or a frequency band that is above the millimeter-wave band. For example, a microwave band or a submillimeter-wave band with a shorter wavelength (0.1 to 1 mm) can be applied. However, for signal transmission within a housing or signal transmission between devices, it is effective to use a millimeter-wave band whose wavelength is neither extremely long nor short.

Hereinafter, a signal transmission device and an electronic device of this embodiment will be specifically described. Although an example in which many functional units are formed on a semiconductor integrated circuit (chip) will be described as the most preferable example, this is not essential.

<Communication Processing System: Reference Configuration>

FIG. 1 is a diagram describing a signal interface of a signal transmission device of this embodiment from the aspect of a functional configuration, which is a reference configuration of a basic configuration 1 to a basic configuration 3 described below. This reference configuration shows a 1:1 signal transmission device 1 having a single transmission system and a single reception system, and does not have a signal distribution, signal switching, or signal collection function using radio communication (wireless signal transmission) adopted in the basic configuration 1 to the basic configuration 3 described below. In the basic configuration 1 to the basic configuration 3 described below, functions of signal distribution, signal switching, and signal collection are realized by radio communication, using a functional part for performing radio communication included in the reference configuration shown herein.

(Functional Configuration)

The signal transmission device 1 is configured such that a first communication device 100, which is an exemplary first wireless device, and a second communication device 200, which is an exemplary second wireless device, are coupled together via a millimeter-wave signal transmission channel 9 to perform signal transmission in a millimeter-wave band. FIG. 1 shows a case where a transmission system is provided on the first communication device 100 side, and a reception system is provided on the second communication device 200 side.

The first communication device 100 is provided with a semiconductor chip 103 that supports millimeter-wave band transmission, and the second communication device 200 is provided with a semiconductor chip 203 that supports millimeter-wave band reception.

In this embodiment, only signals, which are required to have high speed and large volume, are used as signals to be subjected to communication in a millimeter-wave band, and other signals, which may have low speed and small volume or which can be regarded as direct current such as power, are not converted into millimeter-wave signals. As for the signals (including power) not converted into millimeter-wave signals, signal connection between the substrates is achieved with a method similar to the conventional method. The original electrical signal to be transmitted, which is not yet converted into a millimeter wave, will be collectively referred to as a baseband signal.

(First Communication Device)

The first communication device 100 has mounted on a substrate 102 the semiconductor chip 103 that supports millimeter-wave band transmission, and a transmission channel coupling unit 108. The semiconductor chip 103 is an LSI (Large Scale Integrated Circuit) obtained by integrating an LSI functional unit 104 and a signal generation unit 107 (a millimeter-wave signal generation unit) that are exemplary preceding-stage signal processing units.

The semiconductor chip 103 is connected to the transmission channel coupling unit 108. The transmission channel coupling unit 108 is an exemplary transmission unit. For example, an antenna structure having an antenna coupling unit, an antenna terminal, a microstrip line, an antenna, and the like is applied. A portion where the transmission channel coupling unit 108 and the millimeter-wave signal transmission channel 9 are coupled together (i.e., a portion that transmits a wireless signal) is a transmission point. Typically, an antenna corresponds to the transmission point.

The LSI functional unit 104 manages the primary application control of the first communication device 100, and includes a circuit for processing various signals to be transmitted to a counter party, for example.

The signal generation unit 107 (an electrical signal conversion unit) has a signal generation unit 110 on the transmission side for converting a signal from the LSI functional unit 104 into a millimeter-wave signal and controlling the signal transmission via the millimeter-wave signal transmission channel 9. The signal generation unit 110 on the transmission side and the transmission channel coupling unit 108 constitute a transmission system (a transmission unit: a communication unit on the transmission side).

The signal generation unit 110 on the transmission side includes, in order to generate a millimeter-wave signal by performing signal processing on the input signal, a multiplexing processing unit 113, a parallel-serial conversion unit 114, a modulation unit 115, a frequency conversion unit 116, and an amplifier unit 117. The amplifier unit 117 is an exemplary amplitude adjustment unit that adjusts the magnitude of the input signal and outputs it. Note that the modulation unit 115 and the frequency conversion unit 116 can be combined into a so-called direct conversion type.

The multiplexing processing unit 113 performs, when signals from the LSI functional unit 104 include a plurality of types of (referred to as N1) signals to be subjected to communication in a millimeter-wave band, multiplexing processing such as time division multiplexing, frequency division multiplexing, or code-division multiplexing to combine the plurality of types of signals into a signal of a single system. For example, the multiplexing processing unit 113 combines a plurality of types of signals, which are required to have high speed and large volume, into a signal of a single system as the target to be transmitted through a millimeter wave.

The parallel-serial conversion unit 114 converts a parallel signal into a serial data signal, and supplies it to the modulation unit 115. The modulation unit 115 modulates the signal to be transmitted, and supplies it to the frequency conversion unit 116. The parallel-serial conversion unit 114 is provided when a parallel interface specification that uses a plurality of signals for parallel transmission is used when this embodiment is not applied, and is not needed when a serial interface specification is used.

The modulation unit 115 can be basically anything as long as it modulates at least one of the amplitude, frequency, or phase with the signal to be transmitted, and a method combining them as appropriate can also be adopted. Examples of an analog modulation method include amplitude modulation (AM) and vector modulation. Examples of vector modulation include frequency modulation (FM) and phase modulation (PM). Examples of a digital modulation method include amplitude shift keying (ASK), frequency shift keying (FSK), phase shift keying (PSK), and amplitude phase shift keying (APSK) in which the amplitude and phase are modulated. Quadrature Amplitude Modulation (QAM) is a representative example of the amplitude phase shift keying. In this embodiment, in particular, a method that allows a synchronous detection method to be adopted on the reception side is adopted.

The frequency conversion unit 116 converts the frequency of the signal to be transmitted, which has been modulated by the modulation unit 115, to generate a millimeter-wave electrical signal, and supplies it to the amplifier unit 117. A "millimeter-wave electrical signal" refers to an electrical signal in the frequency range of about 30 GHz to 300 GHz. The term "about" herein is based on the fact that it is acceptable as long as a frequency that can provide the effect of millimeter-wave communication is used. Thus, the lower limit is not limited to 30 GHz, and the upper limit is not limited to 300 GHz.

For the frequency conversion unit 116, various circuit configurations can be adopted. For example, a configuration having a frequency mixing circuit (a mixer circuit) and a local oscillator circuit may be adopted. The local oscillator circuit generates a carrier (a carrier signal or a reference carrier) used for modulation. The frequency mixing circuit multiplies (modulates) the carrier of a millimeter-wave band generated by the local oscillator circuit with a signal from the parallel-serial conversion unit 114 to generate a transmission signal of a millimeter-wave band, and supplies it to the amplifier unit 117.

The amplifier unit 117 amplifies the millimeter-wave electrical signal after the frequency conversion, and supplies it to the transmission channel coupling unit 108. The amplifier unit 117 is connected to the two-way transmission channel unit 108 via an antenna terminal (not shown).

The transmission channel coupling unit 108 transmits the millimeter-wave signal generated by the signal generation unit 110 on the transmission side to the millimeter-wave signal transmission channel 9. The transmission channel coupling unit 108 includes an antenna coupling unit. The antenna coupling unit constitutes an example of the transmission channel coupling unit 108 (a signal coupling unit) or a part thereof. The "antenna coupling unit" refers to, in a restricted sense, a portion that couples an electronic circuit within a semiconductor chip to an antenna arranged within or outside the chip, and refers to, in a broad sense, a portion that performs signal coupling between the semiconductor chip and the millimeter-wave signal transmission channel 9. For example, the antenna coupling unit includes at least an antenna structure. The "antenna structure" refers to a structure of the portion coupled to the millimeter-wave signal transmission channel 9, and can be any structure as long as it couples an electrical signal of a millimeter-wave band to the millimeter-wave signal transmission channel 9, and does not refer to only an antenna itself.

The millimeter-wave signal transmission channel 9, which is a propagation channel for millimeter waves, can be configured to propagate a space within the housing, for example, as a free-space transmission channel. Preferably, the millimeter-wave signal transmission channel 9 is formed to have a waveguide structure such as a waveguide, a transmission line, a dielectric line, or a dielectric body, and is desirably configured to confine an electromagnetic wave of a millimeter-wave band within the transmission channel and thus have a property of transmitting the electromagnetic wave efficiently. For example, the millimeter-wave signal transmission channel 9 is preferably formed as a dielectric transmission channel 9A formed to contain a dielectric material having a relative dielectric constant within a given range and a dielectric loss tangent within a given range. For example, when the entire space within the housing is filled with a dielectric material, not a free-space transmission channel, but the dielectric transmission channel 9A is arranged between the transmission channel coupling unit 108 and a transmission channel coupling unit 208. Alternatively, the dielectric transmission channel 9A can be formed by connecting the antenna of the transmission channel coupling unit 108 and the antenna of the transmission channel coupling unit 208 using a dielectric line that is a line-shaped member formed of a dielectric material and having a given line diameter. Note that as the millimeter-wave signal transmission channel 9 with a configuration in which a millimeter-wave signal is confined within the transmission channel, not only the dielectric transmission channel 9A, but also a hollow waveguide can be used in which the transmission channel is surrounded by a shielding material and the inside thereof is hollow.

(Second Communication Device)

The second communication device 200 has mounted on a substrate 202 a semiconductor chip 203 that supports millimeter-wave band reception, and the transmission channel coupling portion 208. The semiconductor chip 203 is an LSI obtained by integrating an LSI functional unit 204 and a signal generation unit 207 (a millimeter-wave signal generation unit) that are exemplary rear-stage signal processing units. Though not shown, it is also possible to provide a configuration in which the LSI functional unit 204 and the signal generation unit 207 are not integrated as in the first communication device 100.

The semiconductor chip 203 is connected to the transmission channel coupling unit 208 that is similar to the transmission channel coupling unit 108. The transmission channel coupling unit 208 is an exemplary reception unit, and a unit that is similar to the transmission channel coupling unit 108 is adopted. The transmission channel coupling unit 208 receives a millimeter-wave signal from the millimeter-wave signal transmission channel 9 and outputs it to a signal generation unit 220 on the reception side.

The signal generation unit 207 (an electrical signal conversion unit) has a signal generation unit 220 on the reception side for controlling the signal reception via the millimeter-wave signal transmission channel 9. The signal generation unit 220 on the reception side and the transmission channel coupling unit 208 constitute a reception system (a reception unit: a communication unit on the reception side). A portion where the transmission channel coupling unit 208 and the millimeter-wave signal transmission channel 9 are coupled together (i.e., a portion that receives a wireless signal) is a reception point. Typically, an antenna corresponds to the reception point.

The signal generation unit 220 on the reception side includes, in order to generate an output signal by performing signal processing on the millimeter-wave electrical signal received by the transmission channel coupling unit 208, an amplifier unit 224, a frequency conversion unit 225, a demodulation unit 226, a serial-parallel conversion unit 227, and a demultiplexing processing unit 228. The amplifier unit 224 is an exemplary amplitude adjustment unit that adjusts the magnitude of the input signal and outputs it. The frequency conversion unit 225 and the demodulation unit 226 can be combined into a so-called direct conversion type. Alternatively, a demodulation carrier signal can be generated by applying an injection lock method.

The signal generation unit 220 on the reception side is connected to the transmission channel coupling unit 208. The amplifier unit 224 on the reception unit is connected to the transmission channel coupling unit 208, and amplifies a millimeter-wave electrical signal received by the antenna, and then supplies it to the frequency conversion unit 225. The frequency conversion unit 225 converts the frequency of the amplified millimeter-wave electrical signal, and supplies the frequency-converted signal to the demodulation unit 226. The demodulation unit 226 demodulates the frequency-converted signal to acquire a baseband signal, and supplies it to the serial-parallel conversion unit 227.

The serial-parallel conversion unit 227 converts the serial received data into parallel output data, and supplies it to the demultiplexing processing unit 228. Like the parallel-serial conversion unit 114, the serial-parallel conversion unit 227 is provided when a parallel interface specification that uses a plurality of signals for parallel transmission is used when this embodiment is not applied. When the original signal transmission between the first communication device 100 and the second communication device 200 is in a serial form, the parallel-serial conversion unit 114 and the serial-parallel conversion unit 227 need not be provided.

When the original signal transmission between the first communication device 100 and the second communication device 200 is in a parallel form, the number of signals to be converted into millimeter waves can be reduced by performing parallel-serial conversion on the input signal and transmitting it to the semiconductor chip 203 or by performing serial-parallel conversion on a received signal from the semiconductor chip 203.

The demultiplexing processing unit 228 corresponds to the multiplexing processing unit 113, and separates signals, which have been combined into one system, into a plurality of types of signals_@ (@ denotes 1 to N). For example, the demultiplexing processing unit 228 separates a plurality of data signals, which have been once combined into a signal of one system, into a plurality of types of signals, and supplies them to the LSI functional unit 204.

The LSI functional unit 204 manages the primary application control of the second communication device 200, and includes a circuit for processing various signals received from a counter party, for example.

(Supporting Two-Way Communication)

The signal generation unit 107 and the transmission channel coupling unit 108, and the signal generation unit 207 and the transmission channel coupling unit 208 can also support two-way communication when they are configured to have data bidirectionality. For example, each of the signal generation unit 107 and the signal generation unit 207 is provided with a signal generation unit on the reception side and a signal generation unit on the transmission side. The transmission channel coupling unit 108 and the transmission channel coupling unit 208 can be separately provided on the transmission side and the reception side, respectively, but they can be used for both transmission and reception.

Note that the "two-way communication" shown herein is single-core two-way communication transmission in which the millimeter-wave signal transmission channel 9 that is a millimeter-wave transmission channel is a single system (a single core). In order to realize this, a half-duplex method that applies TDD (Time Division Duplex), FDD (Frequency Division Duplex), or the like is applied.

(Connection and Operation)

A signal transmission method in which the frequency of an input signal is converted is typically used for broadcast or radio communication. In such applications, a relatively complex transmitter, receiver, and the like, which can cope with the problems of how far the communication can be performed (a problem of S/N against thermal noise), how to address reflections and multipath, how to suppress disturbance or interference with other channels, and the like, are used.

In contrast, the signal generation unit 107 and the signal generation unit 207 used in this embodiment are used in a millimeter-wave band, which is a higher frequency band than the frequency of a complex transmitter, receiver and the like that are typically used for broadcast or radio communication, and the wavelength γ is short. Thus, units that can easily reuse frequency and are suitable for communication between a number of devices located close to each other are used for the signal generation unit 107 and the signal generation unit 207.

In this embodiment, unlike a conventional signal interface using electrical wires, an interface that can flexibly supports high speed and large volume is provided by performing signal transmission in a millimeter band as described above. For example, only signals, which are required to have high speed and large volume, are used as signals to be subjected to communication in a millimeter-wave band. Depending on the device configuration, each of the first communication device 100 and the second communication device 200 partly includes a conventional interface using electrical wires (connection by terminals and connectors) for low-speed, small-volume signals and power supply.

The signal generation unit 107 is an exemplary signal processing unit that performs predetermined signal processing on the basis of a set value. In this example, the signal generation unit 107 performs signal processing on an input signal input from the LSI functional unit 104 to generate a millimeter-wave signal. The signal generation unit 107 is connected to the transmission channel coupling unit 108 via a transmission line such as a microstrip line, a strip line, a coplanar line, or a slot line, and the generated millimeter-wave signal is supplied to the millimeter-wave signal transmission channel 9 via the transmission channel coupling unit 108.

The transmission channel coupling unit 108 has an antenna structure, and has functions of converting the transmitted millimeter-wave signal into an electromagnetic wave and transmitting the electromagnetic wave. The transmission channel coupling unit 108 is coupled to the millimeter-wave signal transmission channel 9, and one end of the millimeter-wave signal transmission channel 9 is supplied with the electromagnetic wave converted by the transmission channel coupling unit 108. The other end of the millimeter-wave signal transmission channel 9 is coupled to the transmission channel coupling unit 208 on the second communication device 200 side. Providing the millimeter-wave signal transmission channel 9 between the transmission channel coupling unit 108 on the first communication device 100 side and the transmission channel coupling unit 208 on the second communication device 200 side allows an electromagnetic wave of a millimeter-wave band to be propagated through the millimeter-wave signal transmission channel 9.

The transmission channel coupling unit 208 on the second communication device 200 side is coupled to the millimeter-wave signal transmission channel 9. The transmission channel coupling unit 208 receives an electromagnetic wave transmitted to the other end of the millimeter-wave signal transmission channel 9, and converts the electromagnetic wave into a millimeter-wave signal, and then supplies it to the signal generation unit 207 (a baseband signal generation unit). The signal generation unit 207 is an exemplary signal processing unit that performs predetermined signal processing on the basis of a set value. In this example, the signal generation unit 207 performs signal processing on the converted millimeter-wave signal to generate an output signal (a baseband signal), and supplies it to the LSI functional unit 204.

Heretofore, description has been made of a case of signal transmission from the first communication device 100 to the second communication device 200. However, when both the first communication device 100 and the second communication device 200 are configured to support two-way communication, a case where a signal from the LSI functional unit 204 of the second communication device 200 is transmitted to the first communication device 100 can be considered in a similar way, and thus millimeter-wave signals can be transmitted in both directions.

<Communication Processing System: Basic Configuration 1 to Basic Configuration 3>

Figure 2:
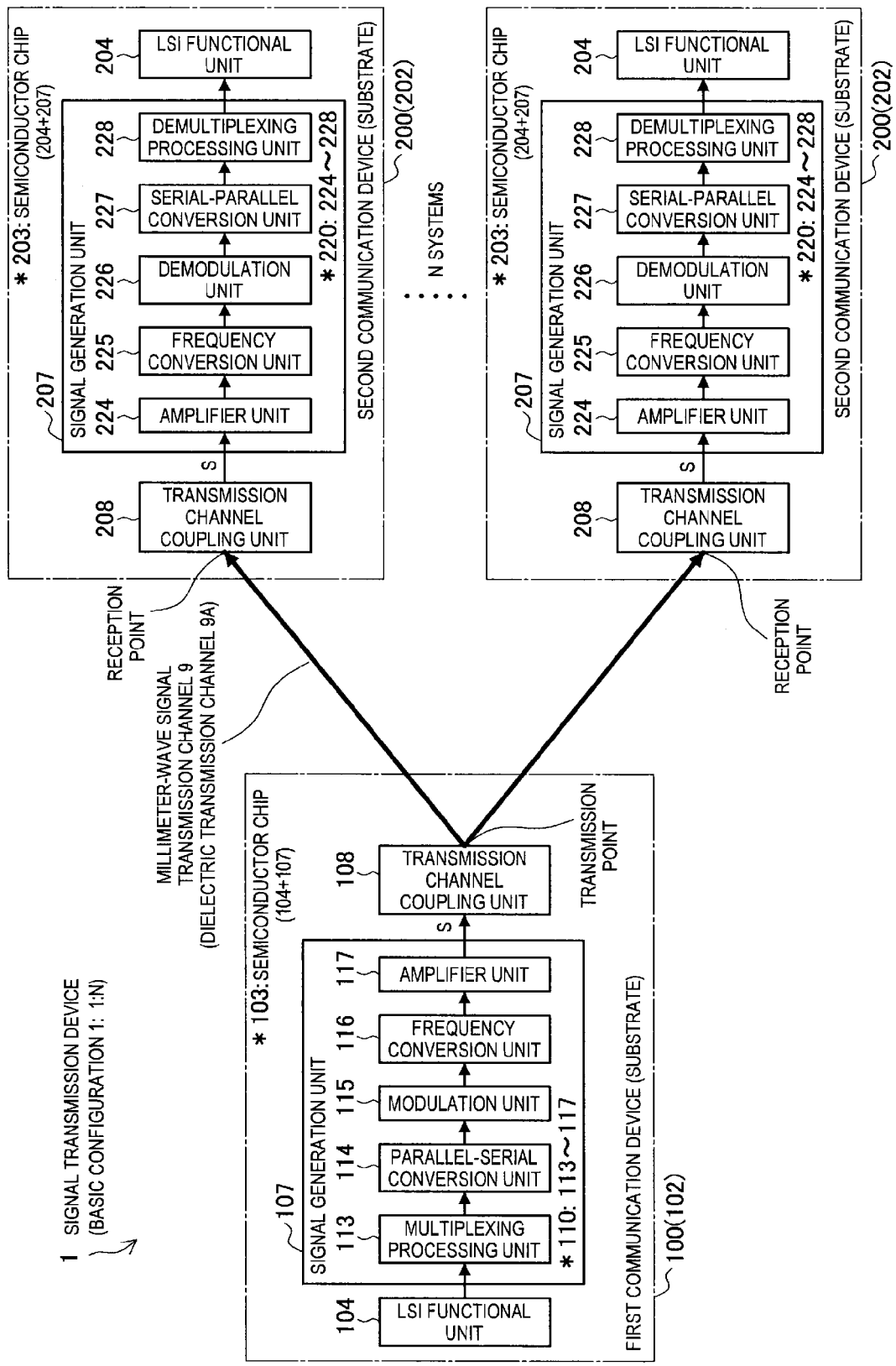
FIG. 2 shows a first basic configuration describing a signal interface of a signal transmission device of this embodiment from the aspect of a functional configuration.

FIG. 2 shows a first basic configuration (basic configuration 1) describing a signal interface of a signal transmission device of this embodiment from the aspect of a functional configuration. The first basic configuration shows a 1:N signal transmission device 1 having a single transmission system and N reception systems, which realizes a signal distribution function in which common wireless signals transmitted from the single transmission system are received (specifically, demodulated) by the plurality of (N) reception systems (preferably, concurrently), and a signal switching function in which a wireless signal transmitted from the single transmission system is selectively received (specifically, demodulated) by any of the plurality of (N) reception systems.

Although FIG. 2 shows an example in which each of the N reception systems is formed as a separate semiconductor chip 203, variations are possible such that the semiconductor chips 203 are combined into a single semiconductor chip, or the N signal generation units 207 are formed as separate semiconductor chips while the N LSI functional units 204 are combined into a single semiconductor chip. In order to realize a signal distribution function, so-called broadcast can be used. In order to realize a signal switching function, a frequency switching method, a code-division multiplexing method, or the like can be applied, and control that uses identification information can also be performed. For example, a frequency switching method can be applied so that the N reception systems are configured to support different carrier frequencies. The single transmission system can be configured as a wide-band transmission circuit that supports N types of carrier frequencies so that modulation is performed using a modulation carrier signal with a carrier frequency corresponding to the desired reception destination of the signal. Alternatively, identification information that distinguishes the N reception systems can be made to be contained in the transmission data so that each reception system can determine if the data is addressed to the reception system on the basis of the identification information and can control whether or not to perform demodulation and subsequent signal processing.

Figure 3:
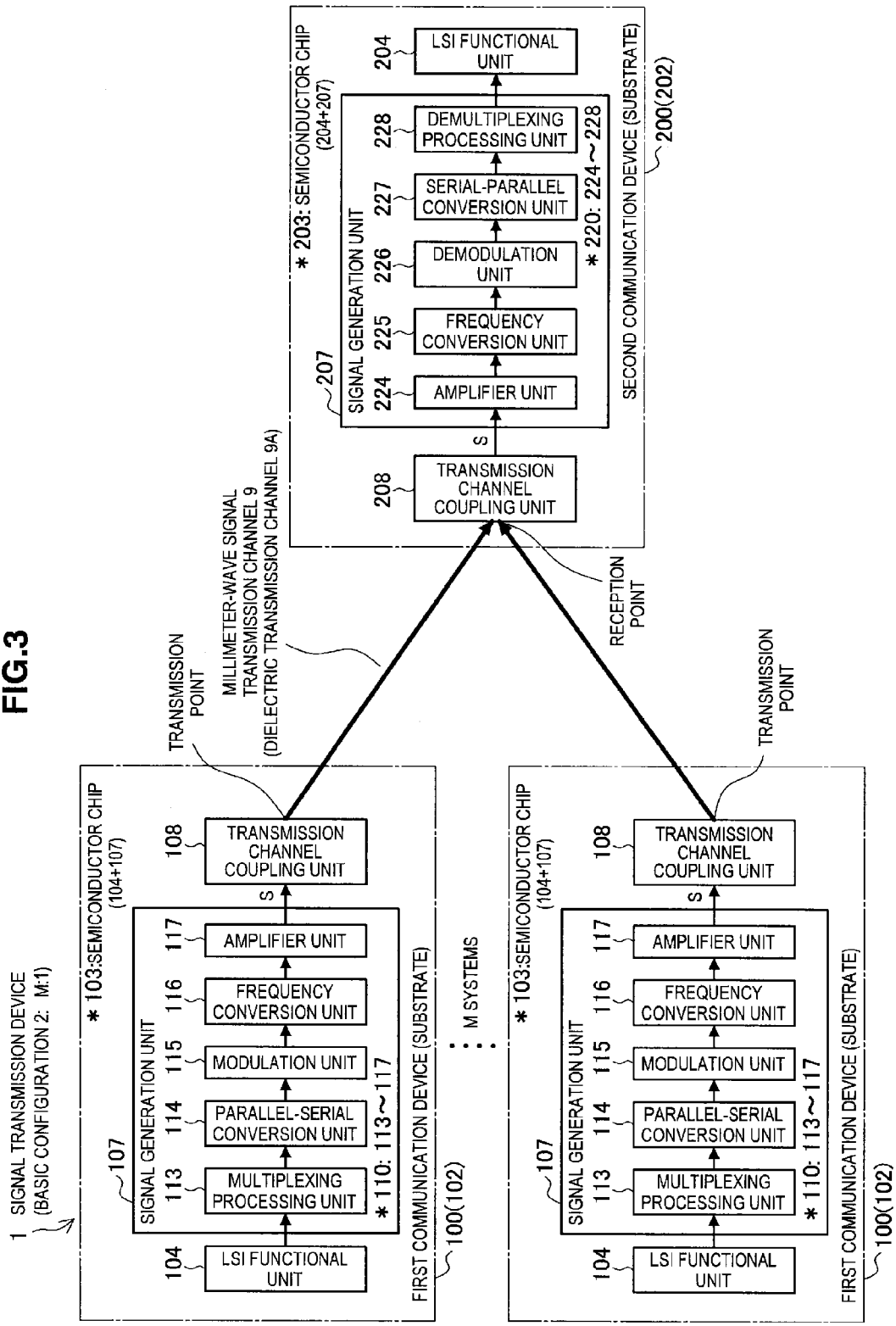
FIG. 3 shows a second basic configuration describing a signal interface of a signal transmission device of this embodiment from the aspect of a functional configuration.

FIG. 3 shows a second basic configuration (basic configuration 2) describing a signal interface of a signal transmission device of this embodiment from the aspect of a functional configuration. The second basic configuration shows an M:1 signal transmission device 1 having M transmission systems and a single reception system, which realizes a signal switching function in which wireless signals transmitted from the plurality of (M) transmission systems are selectively received (specifically, demodulated) by the single reception system, and a signal collection function (or signal aggregation) in which wireless signals transmitted from the plurality of (M) transmission systems are collectively received by the reception system at one point. Although FIG. 3 shows an example in which each of the M transmission systems is formed as a separate semiconductor chip 103, variations are possible such that the semiconductor chips 103 are combined into a single semiconductor chip, or the M signal generation units 107 are formed as separate semiconductor chips while the M LSI functional units 104 are combined into a single semiconductor chip. In order to realize a signal switching function and a signal collection function, a time division multiplexing method, a frequency division multiplexing method, a code-division multiplexing method, or the like can be applied, and control that uses identification information can also be performed. For example, a time division multiplexing method can be applied so that the M transmission systems are configured to support the same carrier frequency and each transmission system performs a transmission process at different timing. Note that identification information that distinguishes the M transmission systems is made to be contained in the transmission data. It is also possible to use a frequency division multiplexing method so that the M transmission systems are configured to support different carrier frequencies, while the single reception system is configured as a wide band reception circuit that supports M types of carrier frequencies so that it performs demodulation for each carrier frequency.

Figure 4:
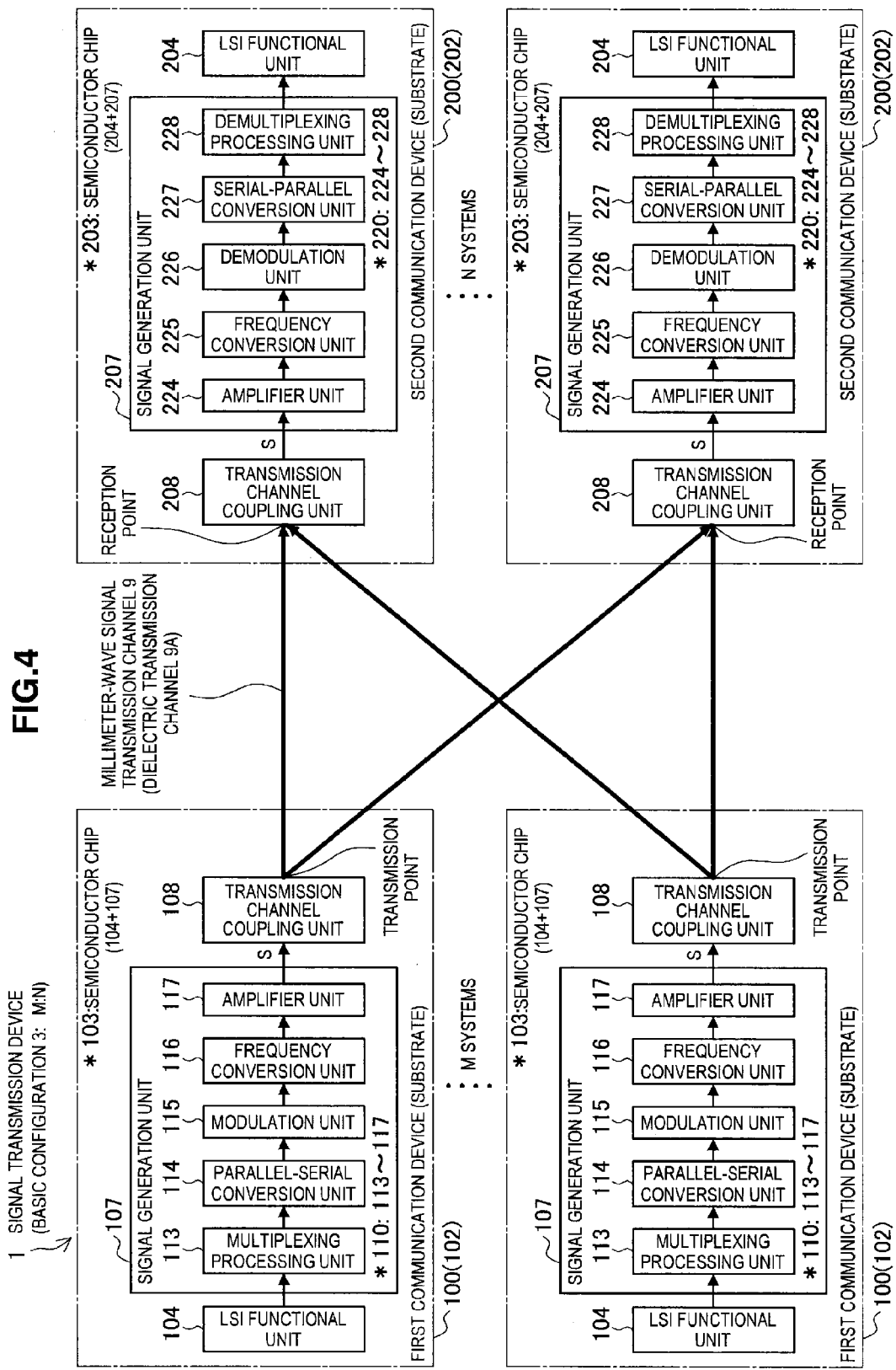
FIG. 4 shows a third basic configuration describing a signal interface of a signal transmission device of this embodiment from the aspect of a functional configuration.

FIG. 4 shows a third basic configuration (basic configuration 3) describing a signal interface of a signal transmission device of this embodiment from the aspect of a functional configuration. The third basic configuration is a combination of the first basic configuration and the second basic configuration, and is an M:N signal transmission device 1 having M transmission systems and N reception systems (M and N can be the same number or different numbers), which realizes a signal distribution function in which wireless signals transmitted from the plurality of (M) transmission systems are received (specifically, demodulated) by the plurality of (N) reception systems (preferably, concurrently), a signal switching function in which wireless signals transmitted from the plurality of (M) transmission systems are selectively received (specifically, demodulated) by any of the plurality of reception systems, and a signal collection function in which wireless signals transmitted from the plurality of (M) transmission systems are collectively received by the reception systems. Each function can be combined as appropriate and applied. In order to realize such functions, it is also possible to apply a time division multiplexing method, a frequency division multiplexing method, a code-division multiplexing method, or the like as can be understood from the descriptions of the basic configuration 1 and the basic configuration 2.

Comparative Example

FIG. 5 is a diagram describing a signal interface of a signal transmission device of a comparative example from the aspect of a functional configuration. FIG. 5(A) shows the overview of the entirety. A signal transmission device 1Z of a comparative example is configured such that a first device 100Z and a second device 200Z are coupled together via an electrical interface 9Z so that signal transmission is performed therebetween. The first device 100Z is provided with a semiconductor chip 103Z capable of transmitting signals via an electrical wire, and the second device 200Z is also provided with a semiconductor chip 203Z capable of transmitting signals via an electrical wire. This is a configuration in which the millimeter-wave signal transmission channel 9 in the first embodiment is replaced by the electrical interface 9Z. In order to transmit signals via an electrical wire, the first device 100Z is provided with an electrical signal conversion unit 107Z instead of the signal generation unit 107 and the transmission channel coupling unit 108, and the second device 200Z is provided with an electrical signal conversion unit 207Z instead of the signal generation unit 207 and the transmission channel coupling unit 208. In the first device 100Z, the electrical signal conversion unit 107Z controls the electrical signal transmission via the electrical interface 9Z for the LSI functional unit 104. Meanwhile, in the second device 200Z, the electrical signal conversion unit 207Z is accessed via the electrical interface 9Z and obtains data transmitted from the LSI functional unit 104 side.

For example, in an electronic device that uses a solid-state imaging device such as a digital camera, it is often the case that the solid-state imaging device is arranged near an optical lens, and various signal processing on an electrical signal from the solid-state imaging device, such as image processing, a compression process, and image saving, is processed in a signal processing circuit outside the solid-state imaging device. Between the solid-state imaging device and the signal processing circuit, a high-speed transfer technology for electrical signals is needed to cope with an increased number of pixels and increased frame rate. For this, LVDS is often used. In order to accurately transmit LVDS signals, matched-impedance termination is necessary. However, an increase in the power consumption is becoming nonbeligible, and in order to transmit a plurality of LVDS signals that should be synchronized, it is necessary to keep the wire lengths to be equal so that wire delays can be sufficiently low. In order to transfer electrical signals at higher speed, there may be cases where the number of LVDS signal lines is increased, for example. However, in this case, the difficulty of the design of the printed wiring board would increase, resulting in increased complexity of the printed wiring board and cable wires as well as an increased number of terminals for wires that connect the solid-state imaging device and the signal processing circuit, which poses an objective of size reduction and cost reduction. Further, when the number of signal lines is increased, the following new problem would arise: an increase in the number of lines could increase the costs of cables and connectors.

JP2003-110919A proposes a camera-shake correction mechanism by moving a solid-state imaging device. However, there is a problem of a load of an actuator for warping a cable for transmitting electrical signals. In contrast, JP 2006-352418A reduces a load of an actuator by using radio transmission. In order to generate a multi-viewpoint image (see JP H09-27969A) or a three-dimensional moving-image data, signals from a plurality of solid-state imaging devices and processing thereon are needed. In such a case, the number of transmission channels that use a high-speed transfer technology within the device could further increase.

Depending on applications such as a signal processing device that handles signals from a plurality of solid-state imaging devices to generate a multi-viewpoint image or the like, it may be necessary to distribute (branch) electrical signals, switch signals, and the like. However, in order to distribute or switch LVDS signals, a signal distribution IC (a sol-called divider IC), a signal switching IC (a so-called switch IC), or the like is used to prevent deterioration of the signal transmission quality.

For example, FIG. 5(A) shows a case where LVDS signals are distributed. Herein, a circuit configuration is exemplarily shown in which a single clock and data n (n denotes the number of pieces of data) are distributed (branched) to two systems. The clock and data are differential (complementary). For each system, the electrical signal conversion unit 107Z is provided with a signal distribution IC, and the electrical signal conversion unit 207Z is provided with two buffer ICs. However, when LVDS signals are distributed as shown in FIG. 5(A), the difficulty of the design of the printed wiring board could further increase, whereby problems of an increased number of integrated circuits for signal distribution and peripheral components thereof as well as an increased number of wires would arise.

JP 2009-27748A describes performing communication using an electromagnetic transmission channel within an electronic device. The technology of this publication requires that when a plurality of transmitters are located with a short distance therebetween and transmission is performed concurrently, the electromagnetic transmission channel should be easily divided in order to avoid crosstalk, but there is no disclosure as to distribution (branching) of electrical signals or signal switching.

In contrast, in the basic configuration 1 to the basic configuration 3 of this embodiment, the electrical signal conversion unit 107Z and the electrical signal conversion unit 207Z of the comparative example are replaced with the signal generation unit 107 and the signal generation unit 207, and the transmission channel coupling unit 108 and the transmission channel coupling unit 208, so that signal transmission is performed not using electrical wires but using a millimeter-wave band (wirelessly). The signal transmission channel is changed from wires to an electromagnetic transmission channel. Therefore, signal distribution can be realized using a so-called broadcast function, and signal switching can be realized using selective reception (demodulation). Thus, signal distribution and signal switching can be performed with a simple configuration. Connectors and cables that have been used for signal transmission using electrical wires become no more necessary, producing the cost reduction effect. Further, it is no more necessary to take into consideration the reliability concerning connectors and cables, producing the effect of increasing the reliability of the transmission channel. When connectors and cables are used, a space and assembly time for mating the connectors and cables are needed. However, when signal distribution or signal switching is performed using radio transmission, a space for assembly is not needed and the size of the device can thus be reduced. As the assembly time can be reduced, the production time can also be reduced.

Next, specific examples of signal distribution and signal switching using radio communication (wireless signal transmission), which is the characteristic point of this embodiment, will be described. Although the present invention will be described using embodiments, the technical scope of the present invention is not limited to the scope of the description of the following embodiments. Various changes or modifications can be made to the following embodiments within the gist of the present invention. Thus, configurations to which such changes or modifications are made also fall within the technical scope of the present invention. Further, the following embodiments are not intended to limit the claimed invention, and it is not necessarily the case that all combinations of the features described in the embodiments are needed for the solution means of the present invention. The following embodiments include inventions at various stages, and various inventions can be extracted by combining a plurality of disclosed constituent features as appropriate. Each of the following embodiments can be applied not only alone but also in combination as appropriate within the range that combination is possible. Even when some of the constituent features are deleted from the entire constituent features shown in the embodiments, features that remain after some of the constituent features are deleted can be extracted as an invention as long as effects are provided. For example, although the following description mainly focuses on an example in which a solid-state imaging device is used as an electronic device, this embodiment in which signal distribution or signal switching is performed using radio communication can be applied even to an electronic device that uses a high-speed transfer technology other than the solid-state imaging device. For example, this embodiment can be applied to an information transmission device for an image signal for image display, and a signal processing method thereof.

Embodiment 1

Figure 6:
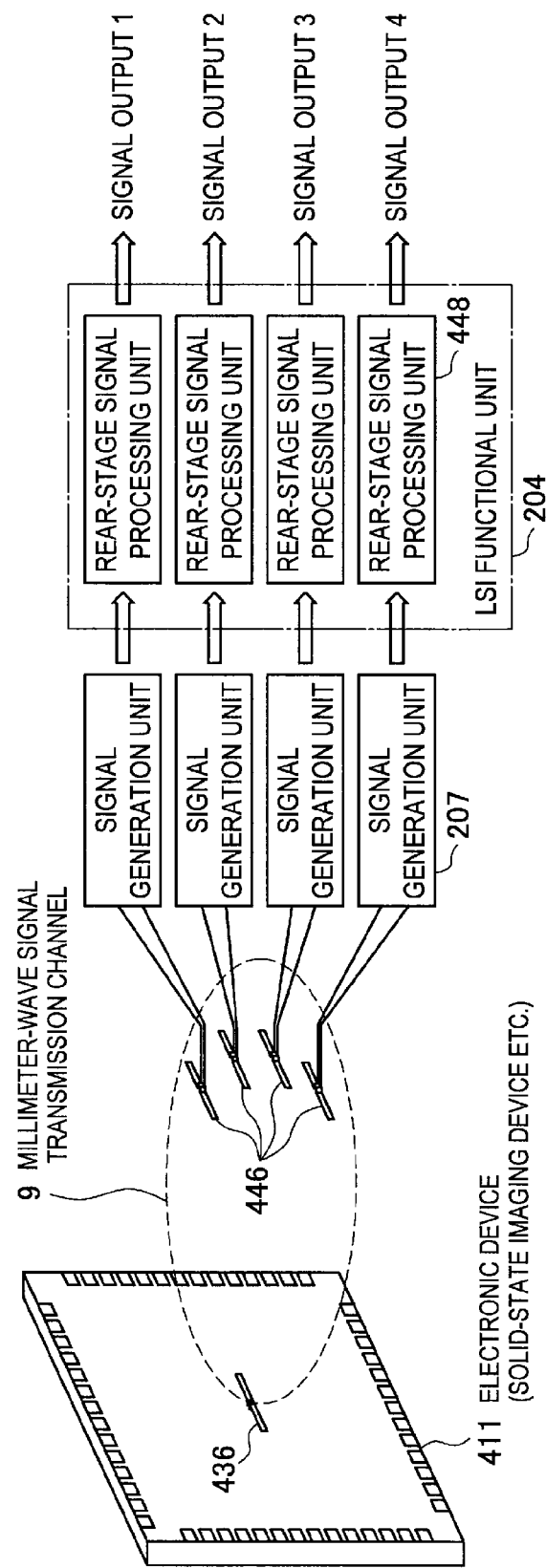
FIG. 6 is a diagram showing the entire configuration of Embodiment 1.
Figure 7:
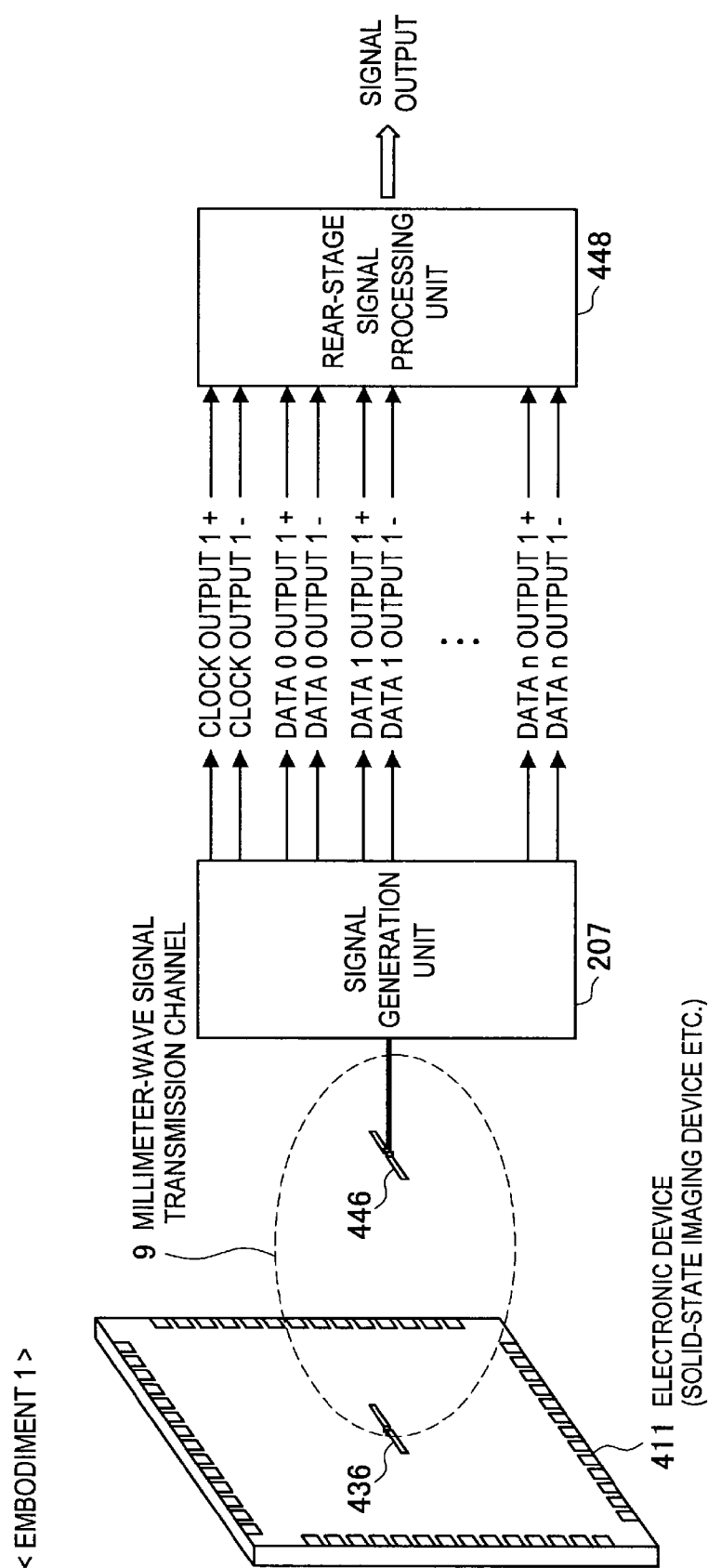
FIG. 7 is a diagram showing a pair of transmission/reception systems in the entire configuration of Embodiment 1.
Figure 8:
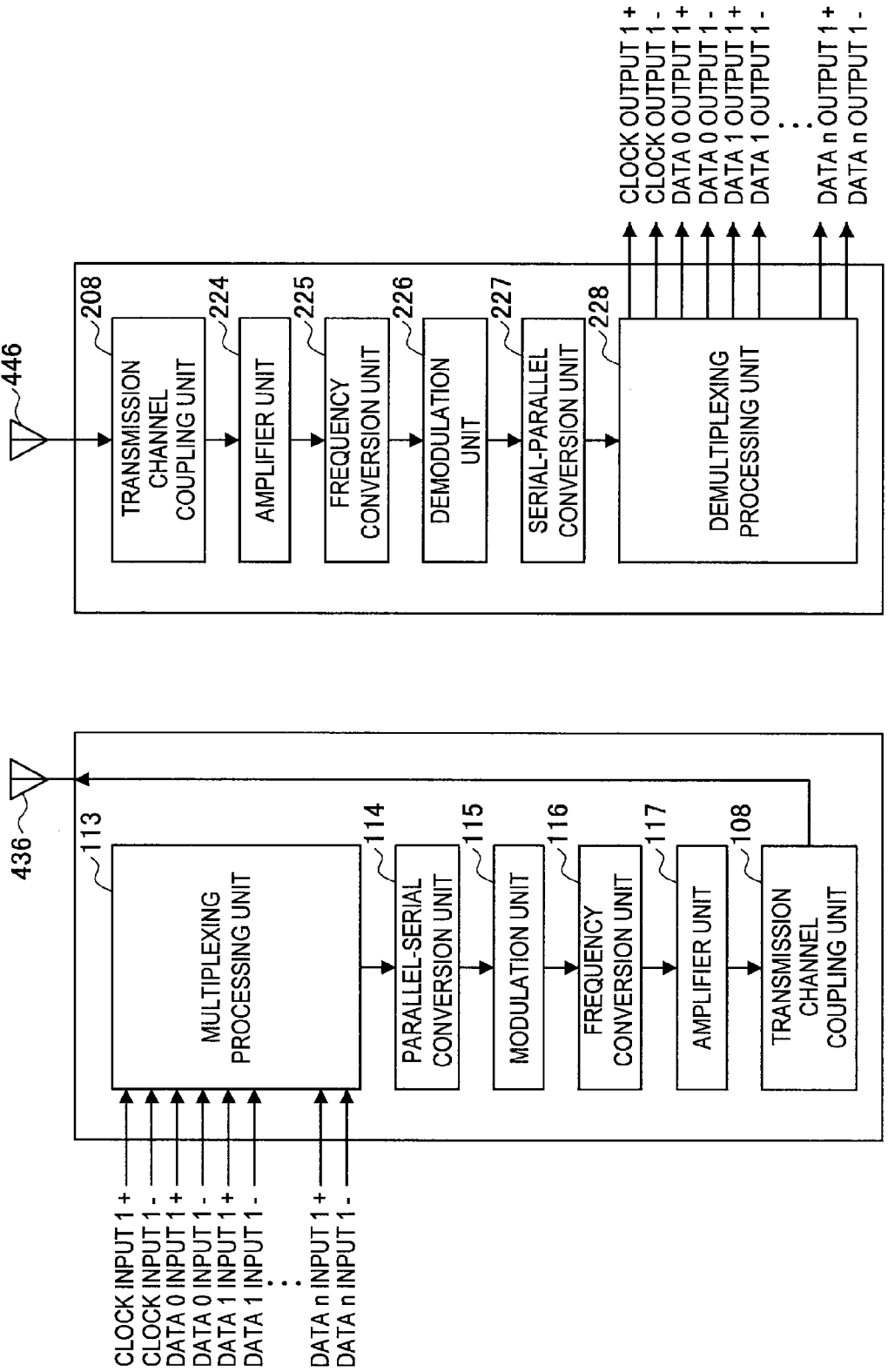
FIG. 8 is a diagram showing a signal processing system on the transmission side and a signal processing system on the reception side.
Figure 9:
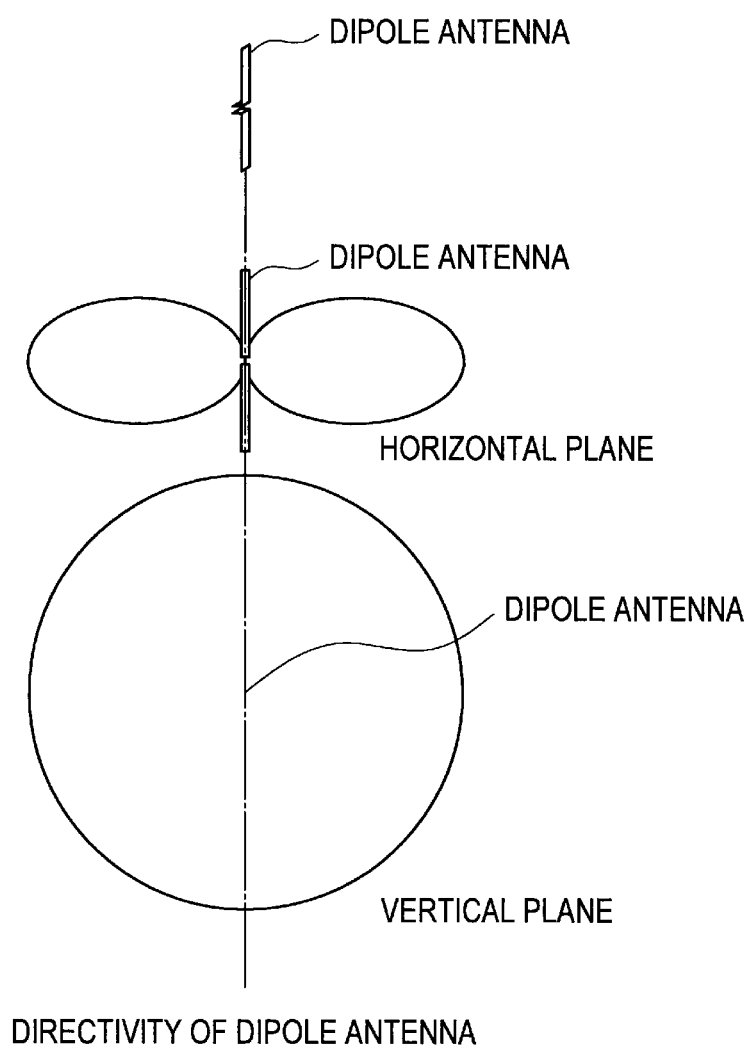
FIG. 9 is a diagram showing an example of the directivity of an antenna.

FIG. 6 to FIG. 9 are diagrams each describing Embodiment 1. Herein, FIG. 6 is a diagram showing the entire configuration of Embodiment 1. FIG. 7 is a diagram showing a pair of transmission/reception systems in the entire configuration of Embodiment 1. FIG. 8 is a diagram showing a signal processing system on the transmission side and a signal processing system on the reception side. FIG. 9 is a diagram showing an example of the directivity of an antenna.

In Embodiment 1, in particular, a single system of a millimeter-wave signal transmission channel 9 (a radio transmission channel) is provided, and the first basic configuration is adopted so that a 1:N signal transmission device 1 having a single transmission system and N reception systems is applied. As shown in FIG. 6, an electronic device 411 (corresponding to the LSI functional unit 104) such as a semiconductor integrated circuit and a solid-state imaging device are provided on the transmission side. The form (aerial form) of a transmission antenna 436 (an aerial on the transmission unit side, a transmission point) is selected from not only a probe antenna such as a dipole antenna, but also from a patch antenna, a loop antenna, a small aperture coupling element (e.g., a slot antenna), or the like in accordance with the properties of the directivity of the antenna as well as the shape of the millimeter-wave signal transmission channel 9 to be generated, and thus is used. The place where the transmission antenna 436 is arranged is, for example, the rear surface of or around the electronic device 411. FIG. 6 shows an example in which a dipole antenna is used for the transmission antenna 436, and is arranged on the rear surface of the electronic device 411.

The form of the aerial can be, for example, an antenna on a semiconductor package shown in JP 2000-68904A, an antenna formed as a single chip shown in JP 2003-101320A, or a form in which the transmission antenna 436 is formed on a printed wiring board on which the electronic device 411 (e.g., a solid-state imaging device) is mounted and is connected to the electronic device 411. Alternatively, it is also possible to use a form in which the transmission antenna 436 formed on another printed wiring board is connected to the electronic device 411. The size of the transmission antenna 436 is, in the case of millimeter waves, about 1 mm though it depends on the frequency used and the peripheral material of the aerial. This is an enough size for the transmission antenna 436 to be arranged on the rear surface of the electronic device 411 (e.g., a solid-state imaging device).

On the reception side, N systems (four systems in FIG. 6) of reception antennae 446 (reception points) and signal generation units 207 are provided to support 1:N signal distribution or signal switching. In the LSI functional unit 204, N systems (four systems in FIG. 6) of rear-stage signal processing units 448 are provided. Functions of the rear-stage signal processing units 448 are set according to demand of a user. For example, the rear-stage signal processing units 448 process signals from the solid-state imaging device for colorization (e.g., to generate signals of the three primary colors of red, blue, and green), perform a compression process for saving image data, or perform a process of converting the signals into a connection format to an external monitor as represented by HDMI (High-Definition Multimedia Interface), DVI (Digital Visual Interface), or the like.

As shown in FIG. 7 and FIG. 8, between a pair of transmission and reception, differential (complementary) signals of a single clock and data n (n denotes the number of pieces of data) are transmitted in a millimeter-wave band via the millimeter-wave signal transmission channel 9, so that transmission without electrical wires is performed. For example, image data from a solid-state imaging device is represented by a clock and data synchronized with the clock. The data is subjected to a process of a transmission system in the signal generation unit 107 shown in FIG. 8, so that the data is converted into a form that can be transmitted to the transmission antenna 436 in a millimeter-wave band, and is then output to the transmission antenna 436 via the transmission channel coupling unit 108. The reception antennae 446 (aerials on the reception side) are arranged on the millimeter-wave signal transmission channel 9 (an electromagnetic transmission channel) that receives a millimeter wave transmitted from the transmission side (e.g., a solid-state imaging device side), and the signals (a single clock and n pieces of data) are demodulated in the signal generation unit 207. When the intensity of the electromagnetic wave is sufficiently high to be received, the reception antennae 446 need not be formed on the same line as the transmission antenna 436, and doe not need to be in the same aerial form as the transmission antenna 436. On the reception side, a process of a reception system is performed in the signal generation unit 207 shown in FIG. 8, and a signal received via the transmission channel coupling unit 108 is demodulated and transferred to the LSI functional unit 204. Thus, transmission of a large-volume, high-speed signal from the electronic device 411 becomes possible.

FIG. 9 shows an exemplary shape of a dipole antenna when the dipole antenna is used as an aerial form used for millimeter waves, and the directivity of the transmission coverage of a millimeter-wave signal radiated form the dipole antenna. A dipole antenna has directivity on the horizontal plane. When a plurality of reception antennae 446 (i.e., respective reception points) are arranged within the transmission coverage of the transmission antenna 436 including the directivity, broadcast can be realized, and signal distribution in which identical signals are distributed to a plurality of points can be easily realized.

It is also possible to realize signal switching by embedding a code, which identifies a reception destination, in the transmission data to allow a single reception destination to be specified among a plurality of reception destinations.

Note that when a plurality of reception antennae 446 are arranged within the transmission coverage of the transmission antenna 436, if the transmission-reception distance (the antenna-to-antenna distance) differs, a phase difference is generated and thus the concurrence of reception is lost. Therefore, when the concurrence of reception is required, that is, when data is transmitted concurrently to a plurality of millimeter-wave band receivers (aerials on the reception side) by arranging a plurality of reception antennae 446 within the transmission coverage generated by the millimeter-wave band transmitter and the aerial on the transmission side, the plurality of reception antennae 446 are preferably arranged within the range of the difference of the distance from the transmission antenna 436 that does not disturb the concurrent transmission of data. That is, the gap between the transmission point and each of the reception points is set within the range that identical signals to be transmitted, which have been transmitted from the transmission point, can be concurrently received at the plurality of reception points.

For example, when a space and structure for inserting a reception antenna are provided within the transmission coverage (an electromagnetic transmission channel) between a combination of the millimeter-wave band transmitter and the aerial on the transmission side and a combination of the millimeter-wave band receiver and the aerials on the reception side, it becomes possible to perform, by inserting an antenna to the electromagnetic transmission channel (within the transmission coverage of the transmission antenna 436), signal distribution, signal switching, or signal collection to the other millimeter-wave band receiver connected to the inserted antenna.

For example, in manufacture of the electronic device 411 (a solid-state imaging device), if a high-speed transmission channel is an electrical wire, a test is performed by forming an electrical contact with a terminal of the electronic device 411 using a pin or the like and connecting it to a testing device. In contrast, when the electronic device 411 is provided with the signal generation unit 107 and the transmission channel coupling unit 108 (including the transmission antenna 436), a test can also be performed wirelessly by inserting a testing antenna within the transmission coverage (an electromagnetic transmission channel) of the transmission antenna 436, whereby an electrical contact with the high-speed transmission channel becomes unnecessary. Therefore, the cost of the testing equipment can be reduced and replacement of the testing equipment can be facilitated.

In the millimeter-wave signal transmission channel 9 for a millimeter-wave band, power consumed by termination that has been performed in the conventional technology like LVDS is not needed any more, whereby power consumption can be reduced. It is also possible to reduce the substrate design time that has been needed to perform impedance matching and design equal-length wires that have been necessary for the LVDS. As it is not necessary to branch or switch a signal using a signal distribution circuit (e.g., an integrated circuit), a switch IC, or the like, the number of components and cost can also be reduced.

When signal distribution or signal switching is performed using radio transmission, electrical wires for the electronic device 411 (a solid-state imaging device) can be limited to wires for power supply and low-frequency signals (including control signals) (the number of electrical wires can be reduced). This produces the effect that replacement of the electrical device 411 becomes easy. For example, under an environment such as space radiation, x-rays, and the like, the electronic device 411 would be easily broken, but replacement is difficult as humans cannot easily intervene. Even under such an environment, if signal distribution or signal switching is performed using radio transmission, replacement becomes easy, and even automatic replacement can be realized according to circumstances.

It is also possible to, by inserting a shielding material such as metal between a plurality electrical devices 411 (e.g., solid-state imaging devices) and switching the millimeter-wave signal transmission channel 9 (the transmission coverage of the transmission antenna 436) that reaches the reception antenna 446, switch the electronic device 411.

Further, signal distribution (branching), which has been difficult to be realized by signal transmission using electrical wires, also becomes easy. For example, it has been conventionally impossible to easily branch the electronic device 411 and an electrical wire thereof. However, using radio transmission allows signal distribution and switching to be performed only by providing the reception antenna 446 for a probe within the transmission coverage of the transmission antenna 436. For example, even when connection of an electrical wire is not changed to isolate a portion where a fault has been generated, it is possible to observe a signal output from the electronic device 411 using a measuring instrument or the like.

Embodiment 2

Figure 10:
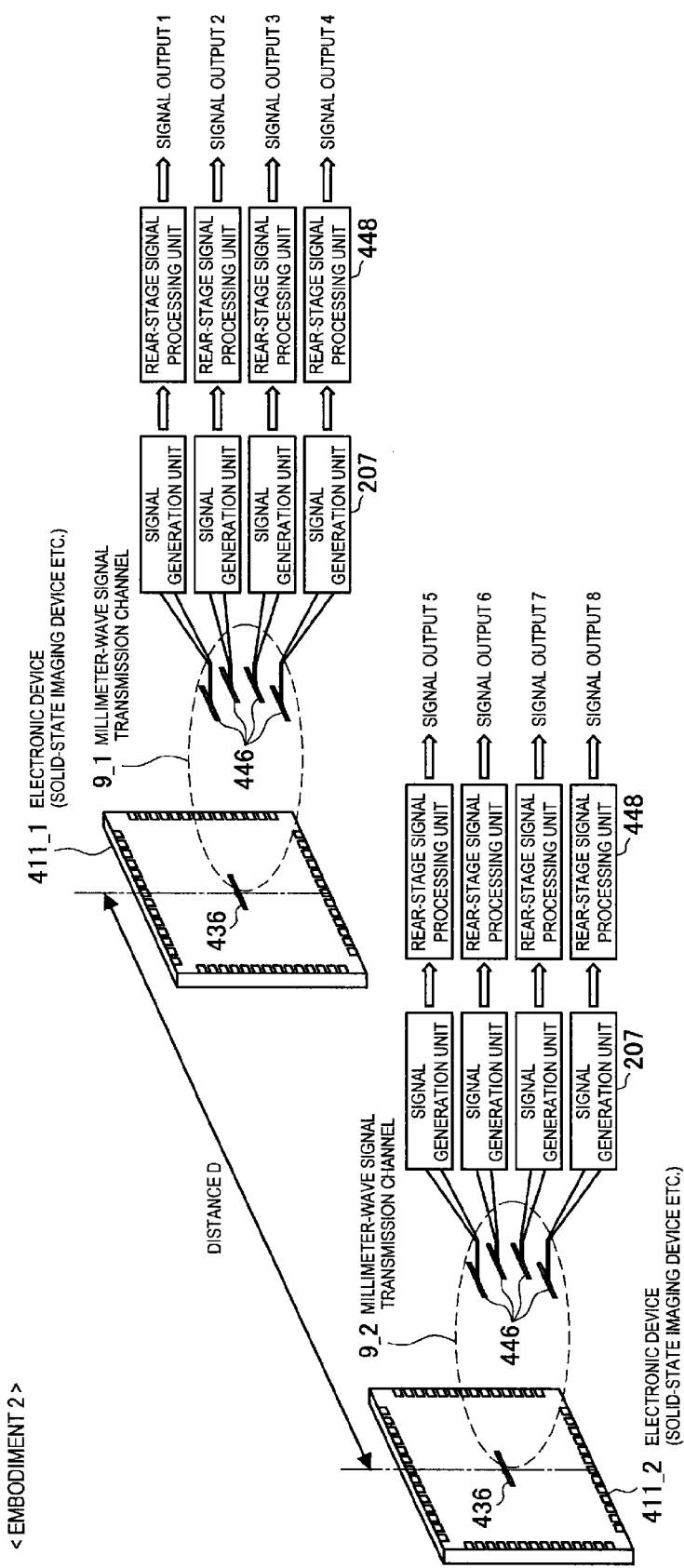
FIG. 10 is a diagram showing the entire configuration of Embodiment 2.

FIG. 10 to FIG. 11 are diagrams describing Embodiment 2. Herein, FIG. 10 is a diagram showing the entire configuration of Embodiment 2, and FIG. 11 are diagrams describing the concept of space division multiplexing adopted in Embodiment 2.

Embodiment 2 describes a case where a plurality of systems of 1:N signal transmission devices 1 (that adopts the first basic configuration), each of which has a single transmission system and N reception systems, are provided. As shown in FIG. 10, a plurality of systems (two systems in FIG. 10) of channels each including an electronic device 411 (an LSI functional unit 104)→a signal generation unit 107→a transmission antenna 436→reception antennae 446, signal generation units 207→an LSI functional unit 204 are provided. When the device as a whole is seen, a configuration that adopts an M:2N signal transmission device 1 (that adopts the third basic configuration) having two transmission systems and 2N reception systems is provided.

In this case, the basic operation of each system is similar to the operation described in Embodiment 1. However, the shorter the channel-to-channel distance D (typically, the distance between the transmission antennae), the closer the transmission coverage (transmission channels) formed by the respective transmission antennae 436. Thus, a problem of interference or crosstalk would arise on the reception side. Sharpening the directivity of the antennae (selecting the aerial form) can lead to a size reduction of the reception antennae 446. This is one of the reasons why a millimeter-wave band is used. The device has a feature that by adjusting the arrangement of the transmission antennae 436, the intensity of electromagnetic waves output from the transmission antenna 436, the arrangement of the reception antennae 446, and the like, it becomes possible to avoid interference or crosstalk even when adjacent transmission channels within the narrow device use the identical frequency band.

However, there are also cases where the channel-to-channel distance D is short and interference or crosstalk between the transmission channels cannot be avoided using the aforementioned method. In such a case, for example, a frequency division multiplexing method can be adopted in which adjacent transmission channels use different frequency bands. Alternatively, as a method other than the frequency division multiplexing method, it is preferable to use a transmission channel (a millimeter-wave signal transmission channel 9) having a structure in which a millimeter-wave signal is transmitted while being confined within the transmission channel (also referred to as a millimeter-wave confining structure or a wireless signal confining structure). By actively using such a millimeter-wave confining structure, it becomes possible to determine as appropriate routing of the millimeter-wave signal transmission channel like an electrical wire, for example.

Such a millimeter-wave confining structure typically corresponds to a so-called waveguide, but the structure is not limited thereto. For example, it is preferable to use the one formed of a dielectric material capable of transmitting millimeter-wave signals (referred to as a dielectric transmission channel or a transmission channel within a millimeter-wave dielectric body), or a hollow waveguide that forms a transmission channel and has a structure in which a shielding material for suppressing external radiation of millimeter-wave signals is provided such that it surrounds the transmission channel and the inside of the shielding material is hollow. By making the dielectric material or the shielding material to have flexibility, routing of the millimeter-wave signal transmission channel becomes possible. When the transmission channel is air (a so-called free space), each signal coupling unit has an antenna structure, and short-distance signal transmission through the air is performed with the antenna structure. Meanwhile, when the transmission channel is formed of a dielectric material, it can also have an antenna structure, but this is not essential.

The plurality of systems of millimeter-wave signal transmission channels 9 are arranged such they do not spatially interfere with each other, whereby communication can be performed concurrently using the identical frequency. In this embodiment, such a method is referred to as space division multiplexing. In attempting to increase the number of transmission channels, if space division multiplexing is not applied, frequency division multiplexing is applied, in which case each channel should use a different carrier frequency. However, when space division multiplexing is applied, transmission can be performed using the identical carrier frequency without the influence of interference.

The "space division multiplexing" can be anything as long as it forms a plurality of systems of millimeter-wave signal transmission channels 9 in a three-dimensional space capable of transmitting millimeter-wave signals (electromagnetic waves), and is not limited to the one in which a plurality of systems of millimeter-wave signal transmission channels 9 are formed in a free space. For example, when a three-dimensional space capable of transmitting millimeter-wave signals (electromagnetic waves) is formed of a dielectric material (an organic material), a plurality of systems of millimeter-wave signal transmission channels 9 can be formed within the dielectric material. In addition, each of the plurality of systems of millimeter-wave signal transmission channels 9 is not limited to a free space, either, and can adopt a configuration of a dielectric transmission channel, a hollow waveguide, or the like.

In the space division multiplexing, the identical frequency band can be used at the same time. Thus, it is possible to increase the communication rate and ensure the concurrence of two-way communication in which signal transmission for a channel N1 from the first communication device 100C to the second communication device 200C and signal transmission for a channel N2 from the second communication device 200C to the first communication device 100C are performed concurrently. In particular, as a millimeter wave has a short wavelength, a distance attenuation effect can be expected and interference is unlikely to occur even when the offset is small (when the spatial distance of a transmission channel is short). Thus, transmission channels that differ depending on places can be easily realized.

FIG. 11 show the appropriate conditions of the "space division multiplexing." The carrier frequency of each system can be either the same or different. For example, in the case of a dielectric transmission channel or a hollow waveguide, a millimeter wave is confined inside. Thus, millimeter-wave interference can be avoided and the identical frequency can be used without any problem. In the case of a free-space transmission channel, the identical frequency can be used if adjacent free-space transmission channels are provided apart from each other to a certain extent. However, when the adjacent free-space transmission channels are located with a short distance therebetween, different frequencies are preferably used.

For example, as shown in FIG. 11(A), a propagation loss L of a free space can be represented by "L[dB]=10 $\log_{10}((4\pi d/\lambda)^2)$ . . . (A)" where d denotes the distance and $\lambda$ denotes the wavelength.

As shown in FIG. 11, two types of communication of space division multiplexing are considered. In FIG. 11, a transmitter is represented by "TX" and a receiver is represented by "RX." Reference numeral "_100" denotes the first communication device 100 side, and reference numeral "_200" denotes the second communication device 200 side. In FIG. 11(B), the first communication device 100 has two systems of a transmitter TX_100_1 and a transmitter TX_100_2, and the second communication device 200 has two systems of a receiver RX_200_1 and a receiver RX_200_2. That is, signal transmission from the first communication device 100 side to the second communication device 200 side is performed between the transmitter TX_100_1 and the receiver RX_200_1 and between the transmitter TX_100_2 and the receiver RX_200_2. That is, this is a configuration in which signal transmission from the first communication device 100 side to the second communication device 200 side is performed using two systems.

Meanwhile, in FIG. 11(C), the first communication device 100 has a transmitter TX_100 and a receiver RX_100, and the second communication device 200 has a transmitter TX_200 and a receiver RX_200. That is, signal transmission from the first communication device 100 side to the second communication device 200 side is performed between the transmitter TX_100 and the receiver RX_200, and signal transmission from the second communication device 200 side to the first communication device 100 side is performed between the transmitter TX_200 and the receiver RX_100. This is the concept of using different communication channels for transmission and reception, and is a configuration of full duplex in which data transmission (TX) and reception (RX) can be concurrently performed from both sides.

Herein, antennae having no directivity are used. The relationship between the antenna-to-antenna distance $d_1$, which is necessary to obtain necessary DU [dB] (the ratio between a desired wave and an unwanted wave), and the spatial channel-to-channel distance (specifically, the offset distance of a free-space transmission channel 9B) $d_2$ is derived from Formula (A) as follows: "$d_2/d_1 = 10^{(DU/20)}$ ... (B)." For example, when DU=20 dB, $d_2/d_1=10$, which means that $d_2$ should be ten times that of $d_1$. Typically, an antenna has directivity to a certain extent. Thus, $d_2$ can be set shorter even in the case of the free-space transmission channel 9B.

For example, when the distance from an antenna of another communication party is close, the transmission power of each antenna can be suppressed low. If the transmission power can be sufficiently low and a pair of antennae can be arranged at positions sufficiently away from each other, interference between the pair of antennae can be suppressed sufficiently. In particular, as the millimeter-wave communication uses a millimeter wave with a short wavelength, distance attenuation is large and diffraction is small. Thus, space division multiplexing can be easily realized. For example, even in the case of the free-space transmission channel 9B, the spatial channel-to-channel distance (specifically, the offset distance of the free-space transmission channel 9B) $d_2$ can be set lower than ten times that of the antenna-to-antenna distance $d_1$.

In the case of a dielectric transmission channel or a hollow waveguide having a millimeter-wave confining structure, a millimeter wave can be transmitted while being confined inside. Thus, the spatial channel-to-channel distance (specifically, the offset distance of a free-space transmission channel) $d_2$ can be set lower than ten times that of the antenna-to-antenna distance $d_1$. In particular, in comparison with the free-space transmission channel 9B, the channel-to-channel distance can be set closer to each other.

Embodiment 3

Figure 12:
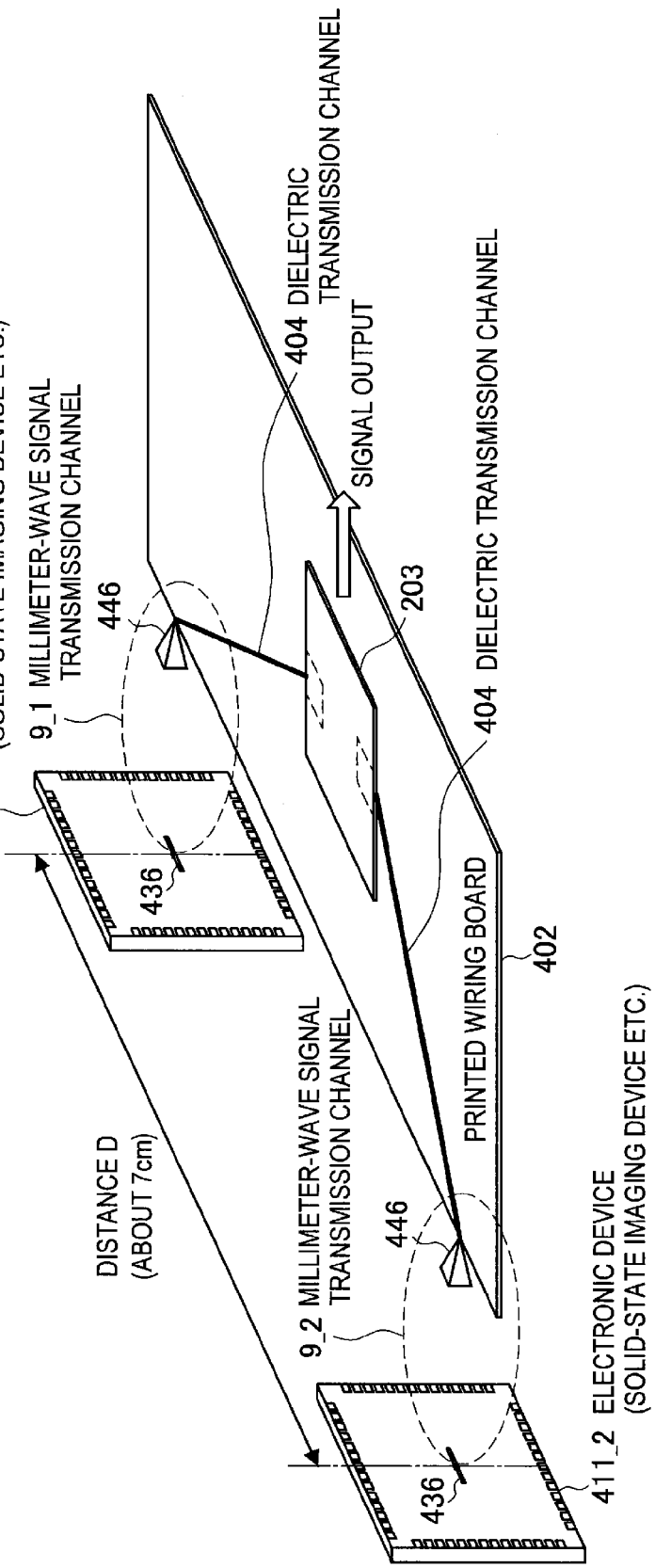
FIG. 12 is a diagram describing Embodiment 3.

FIG. 12 is a diagram describing Embodiment 3. In Embodiment 3, a single signal is generated on the reception side on the basis of a plurality of signals acquired by a plurality of electronic devices 411, using Embodiment 2. For example, Embodiment 3 can be applied to the generation of three-dimensional (3D) image data that has been gaining popularity in recent years. A 3D image is generated by processing images captured by an imaging system (including lenses and the like) that includes a plurality of solid-state imaging devices arranged at the channel-to-channel distance D therebetween that is about equal to the gap (about 7 cm) between the eyes of humans. Although a case is shown where a plurality of systems of reference configuration each having a single transmission system and a single reception system are provided, when the device as a whole is seen, it can be considered as a configuration that adopts an M:1 signal transmission device 1 (that adopts the second basic configuration) having two transmission systems and a single reception system.

In FIG. 12, a plurality of pieces of information (e.g., a left-eye image and a right-eye image) obtained by an electronic device 411_1 (e.g., a solid-state imaging device) and an electronic device 411_2 (e.g., a solid-state imaging device) are transmitted at high speed, using transmission channels (millimeter-wave signal transmission channels 9) formed by a transmission antenna 436_1 and a transmission antenna 436_2, respectively. On the reception side, a reception antenna 446_1 corresponding to the transmission antenna 436_2 and a reception antenna 446_2 corresponding to the transmission antenna 436_1 are provided on the periphery of a printed wiring board 402.

In FIG. 12, dipole antennae are used for the transmission antennae 436, and horn antennae are used for the reception antennae 446. Electromagnetic waves received by the reception antennae 446 are transmitted to the semiconductor chip 203 incorporating the signal generation unit 207 and the LSI functional unit 204, using dielectric transmission channels 404 provided on the printed wiring board 402. The signal generation unit 207 demodulates the received high-speed transmission signals, and the LSI functional unit 204 generates a 3D image (a signal output) on the basis of the demodulated signals of the two systems. In this case, signal distribution in which a signal of each system is distributed to a plurality of (two) processing circuits, signal switching in which a signal of each system is selectively input to any of a plurality of (two) processing circuits, or signal switching in which a signal of any of the plurality of (two) systems is input to a single processing circuit is performed. As a whole, signal distribution or signal switching using radio communication is realized. As a variation, units up to and including the signal generation unit 207 of the reception system can be arranged near the reception antenna 446, so that the received signals can be demodulated into baseband signals and transmitted to the LSI functional unit, which incorporates a functional unit for generating a 3D image, through electrical wires.

In order to provide the dielectric transmission channels 404 on the printed wiring board 402, a method of forming a transmission region in the substrate using a through-hole fence may be adopted, for example. That is, the dielectric transmission channels 404 are formed by defining a transmission region by a plurality of openings (through-holes) in hollow cylindrical shapes penetrating the printed wiring board 402. For example, on the printed wiring board 402 between the reception antenna 446_1 and the reception antenna 446_2 and the semiconductor chip 203, two lines of line-shaped through-holes are formed along the direction in which millimeter-wave signals S are to be propagated. The arrangement pitch p between a single through-hole and another adjacent through-hole in the arrangement direction is set to less than or equal to p=$\lambda/2$ ($\lambda$ denotes the wavelength of a wireless signal), for example. Provided that the width between the two lines of through-holes is the width w of the transmission region (i.e., the dielectric transmission channels 404), w is set to greater than or equal to λ/2. For the through-holes, not only hollow cylindrical members, but also cylindrical conductive members can be used. By grounding the cylindrical conductive members, for example, the phase as the dielectric waveguide can be adjusted. As described above, the transmission region is defined by the two lines of openings (a through-hole fence). It is also possible to arrange a screen component such as a repeater on the printed wiring board 402 to control the transmission coverage of millimeter-wave signals S.

Embodiment 4

Figure 13:
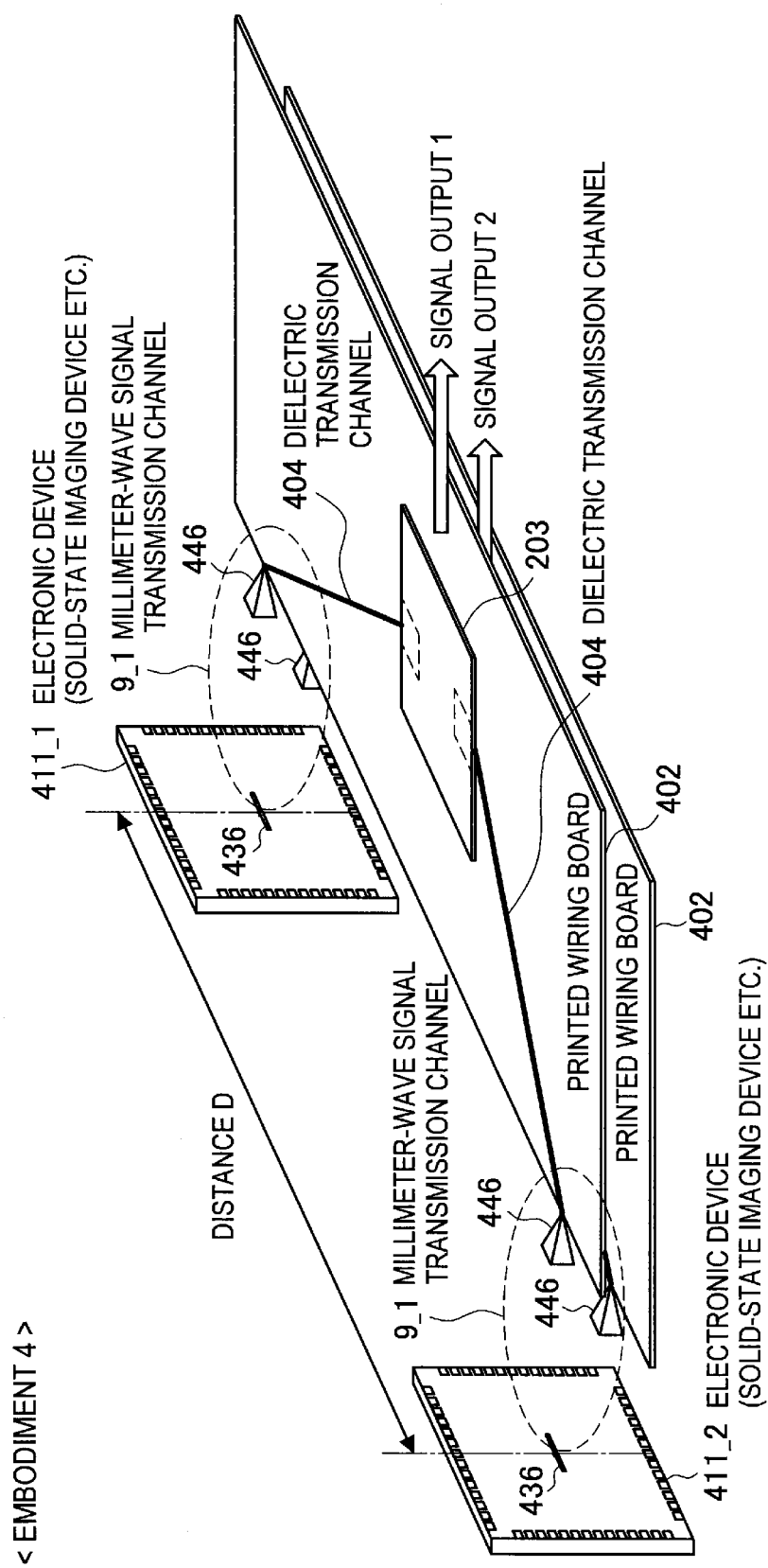
FIG. 13 is a diagram describing Embodiment 4.

FIG. 13 is a diagram describing Embodiment 4. In Embodiment 4, a plurality of pairs of configurations are provided in each of which signals acquired by a single electronic device 411 are processed on the reception side. Each pair performs signal processing with a different property. Accordingly, a plurality of signals with different properties can be acquired on the basis of signals acquired by a single electronic device 411. As an example, a plurality of pairs of methods are provided in each of which a plurality of signals acquired by a plurality of electronic devices 411 are processed on the reception side to generate a single signal, using Embodiment 3. For example, Embodiment 4 can be applied to a case where, in generating three-dimensional (3D) image data, for example, a plurality of 3D images with different properties are concurrently generated.

As shown in FIG. 13, a plurality of printed wiring boards 402, which are similar to the one shown in Embodiment 3, for example, a printed wiring board 402_1 and a printed wiring board 402_2, are overlaid one on top of the other, and each reception antenna 446_1 is provided within the transmission coverage of the transmission antenna 436_1, and each reception antenna 446_2 is provided within the transmission coverage of the transmission antenna 436_2. As a 3D image can be generated in the semiconductor chip 203 on each printed wiring board 402, a plurality of 3D images can be generated concurrently.

Accordingly, by varying the content of the signal processor in the semiconductor chip 203 (the LSI functional unit 204) on each printed wiring board 402, it becomes possible to concurrently obtain two types of 3D images with different processing (different properties). Examples of different processing include obtaining 3D images with different senses of depth by changing the strength of the shadow, for example. By increasing the number of identical substrates, it becomes possible to concurrently obtain a plurality of types of 3D images with different processing (different properties).

Embodiment 5

Figure 14:
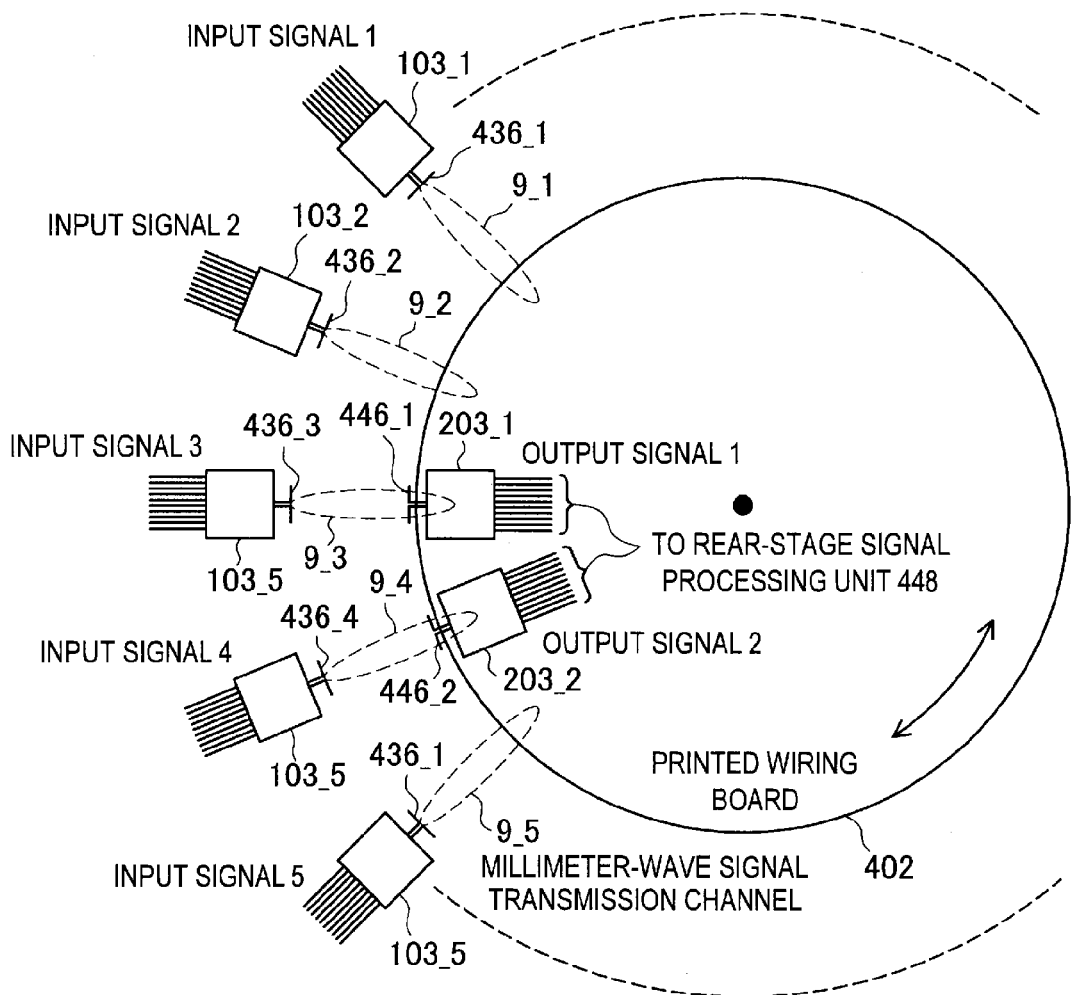
FIG. 14 is a diagram describing Embodiment 5.

FIG. 14 is a diagram describing Embodiment 5. Embodiment 5 shows a configuration in which a transmission antenna 436 and a reception antenna 446 are moved relative to each other to realize switching of a received signal. For example, Embodiment 5 is applied to a case where, in a rotating structure, a first communication unit and a second communication unit rotate relative to each other and signal transmission between the first communication unit and the second communication unit is performed wirelessly.

As shown in FIG. 14, a pair of a transmission antenna 436 and a semiconductor chip 103 is arranged at about regular intervals around the entire circumference of a circular printed wiring board 402 (FIG. 14 shows five: "_1" to "_5"). Inside the circumference, a single set, which includes a pair of a reception antenna 446_1 and a semiconductor chip 203_1 and a pair of a reception antenna 446_2 and a semiconductor chip 203_2, is arranged opposite the two adjacent transmission antennae 436 (FIG. 14 shows two: "_3" and "_4") among the plurality of transmission antennae 436 arranged along the circumference of the printed wiring board 402. Even when addition of an input signal is required, addition of the input signal can be realized as long as a pair of a semiconductor chip 103 (including a signal generation unit 107 and a transmission channel coupling unit 108) and a transmission antenna 436 can be arranged without interference or crosstalk of the electromagnetic wave transmission channel.

The transmission side is designed as a stationary unit and the reception side is designed as a movable unit capable of rotating in an endless manner. The movable unit can be formed by, for example, arranging the semiconductor chip 203, which incorporates the signal generation unit 207 and the like, the reception antenna 446, and the like on the rotating printed wiring board 402. Such a configuration makes it possible to sequentially switch and receive wireless signals radiated from a pair of adjacent transmission antennae 436 within the transmission coverage formed by the respective transmission antennae 436. In other words, the transmission coverage (the millimeter-wave signal transmission channels 9) formed by the transmission antennae 436 realizes switching of the electromagnetic transmission channels that are received upon movement of the aerials on the reception unit side, which are arranged on the rotating printed wiring board, as well as the reception units.

Further, as shown in Embodiment 4, when a plurality of printed wiring boards 402, on each of which the reception antenna 446 and the semiconductor chip 203 are arranged, are overlaid one on top of the other, it is also possible to obtain a plurality of signal outputs with different properties. For example, a multi-viewpoint signal processing device or the like, which handles a plurality of solid-state imaging devices, handles a number of high-speed transmission signals. Switching of such signals can be changed without changing the design of the printed wiring board 402.

For example, in order to switch a high-speed transmission signal of an electrical signal from an electronic device 411 (e.g., a solid-state imaging device), a switching circuit (a switch IC) would be needed. Accordingly, the more the input signals to be switched, the more the number of components, the longer the design time, and the higher the cost. Further, when an input signal to be switched is to be added, it would be necessary to, in the case of electrical signal transmission, redesign the circuit and the printed wiring board. In contrast, according to Embodiment 5, design change of the circuit and the printed wiring board is not necessary.

Further, for example, when a rotating (typically, endlessly rotating) structure is used, there will be inconvenience if a strip line is applied to each of a stationary unit and a movable unit and a linearly polarized radio wave is just propagated through a waveguide. When a strip line on the movable unit side transmits a radio wave through linear polarization, the linearly polarized wave will endlessly spin. However, it is impossible for a strip line, which receives a linearly polarized wave, on the stationary unit side to receive the endlessly spinning linearly polarized wave without difficulty. Transmission and reception are only possible within a narrow range in which a position where the both directions coincide is the center. As a measure against this, when radio transmission is applied to a rotating structure, a circularly polarized wave may be adopted for transmission and reception. However, in order to adopt a circularly polarized wave, a corresponding ingenuity is needed. In contrast, according to Embodiment 5, an endless-rotation-compatible 3D camera can be easily realized.

Embodiment 6

Variations of Embodiment 1 to Embodiment 5

Figure 15:
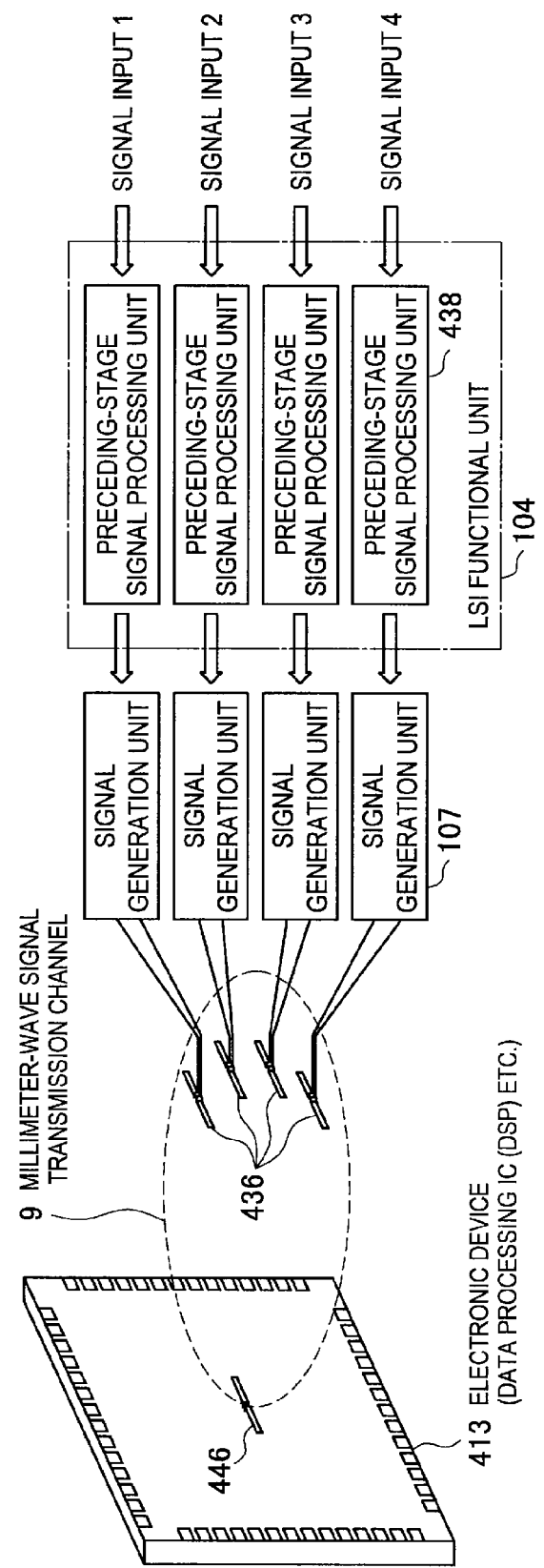
FIG. 15 is a diagram describing Embodiment 6.

FIG. 15 is a diagram describing Embodiment 6. Embodiment 6 shows a case in which a single system of a millimeter-wave signal transmission channel 9 (a radio transmission channel) is provided, in particular, and an M:1 signal transmission device 1 having M transmission systems and a single reception system is applied by adopting the second basic configuration, which is a variation in which the transmission system and the reception system in Embodiment 1 are interchanged.

As shown in FIG. 15, an electronic device 413 (corresponding to the signal generation unit 207 and the LSI functional unit 204) such as a semiconductor integrated circuit (e.g., a data processing IC including DSP) is provided on the reception side. The form (aerial form) of a reception antenna 446 (an aerial on the reception unit side, a reception point) is selected from not only a probe antenna such as a dipole antenna, but also from a patch antenna, a loop antenna, a small aperture coupling element (e.g., a slot antenna), or the like in accordance with the properties of the directivity of the antenna as well as the shape of the millimeter-wave signal transmission channel 9 to be generated, and thus is used, like the transmission antenna 436 in Embodiment 1. The place where the reception antenna 446 is arranged is, for example, the rear surface of or around the electronic device 413. FIG. 15 shows an example in which a dipole antenna is used for the reception antenna 446, and is arranged on the rear surface of the electronic device 413.

On the transmission side, M systems (four systems in FIG. 15) of transmission antennae 436 (transmission points) and signal generation units 107 are provided to support M:1 signal collection or signal switching. In the LSI functional unit 104, M systems (four systems in FIG. 15) of preceding-stage signal processing units 438 are provided. Functions of the preceding-stage signal processing units 438 are set according to demand of a user.

In Embodiment 6, a signal flow is opposite to that in Embodiment 1, and wireless signal transmission is performed in which a plurality of signal inputs (a signal input 1 to a signal input 4 in this example) of the M systems on the transmission side are transmitted to a single point on the reception side. Accordingly, it is possible to realize a signal collection function in which wireless signals transmitted from a plurality of transmission systems are collectively received by a reception system at a single point, and a signal switching function in which wireless signals transmitted from a plurality of transmission systems are selectively received by a single reception system.

As in Embodiment 1, a plurality of transmission antennae 436 (i.e., respective transmission points) are arranged within the transmission coverage of the reception antenna 446, whereby signal collection in which a plurality of signals are collected into a single point and signal switching in which any of a plurality of signals are selectively received are easily realized. In this case, a time division multiplexing method, a frequency division multiplexing method, or the like is applied so that each transmission signal can be distinguished from each other on the reception side. When a plurality of transmission antennae 436 are arranged within the transmission coverage of the reception antenna 446, if the transmission-reception distance (the antenna-to-antenna distance) differs, a phase difference is generated and thus the concurrence of reception is lost. Therefore, when a plurality of pieces of data are concurrently transmitted to a millimeter-wave band receiver (an aerial on the reception side) at a single point by applying a frequency division multiplexing method, for example, the plurality of transmission antennae 436 are preferably arranged within the range of the difference of the distance from the reception antenna 446 that does not disturb the concurrent transmission of data.

Embodiment 7

Figure 16:
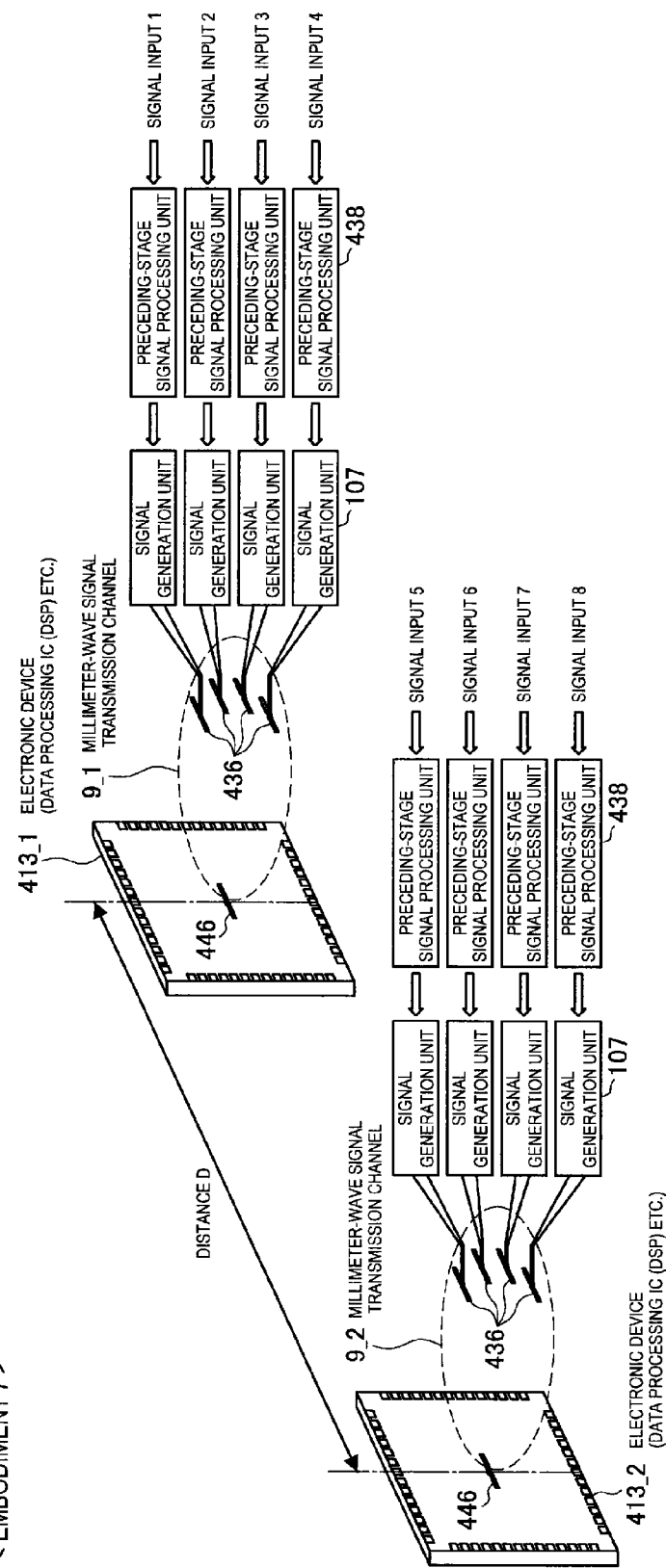
FIG. 16 is a diagram describing Embodiment 7.

FIG. 16 is a diagram describing Embodiment 7. Embodiment 7 shows a case where a plurality of systems of M:1 signal transmission devices 1 (that adopts the second basic configuration) each having a single reception system and M transmission systems are provided, which is a variation in which the transmission system and the reception system in Embodiment 1 are interchanged. As shown in FIG. 16, a plurality of systems (two systems in FIG. 16) of channels (transmission channels) each including preceding-stage signal processing units 438 (plural)→signal generation units 107 (plural)→transmission antennae 436 (plural)→a reception antenna 446 (singular) are provided. The basic operation of each transmission channel is similar to the operation described in Embodiment 6. As in Embodiment 2, between the transmission channels, measures such as optimization of the channel-to-channel distance D are adopted to avoid interference and crosstalk.

Embodiment 8

Figure 17:
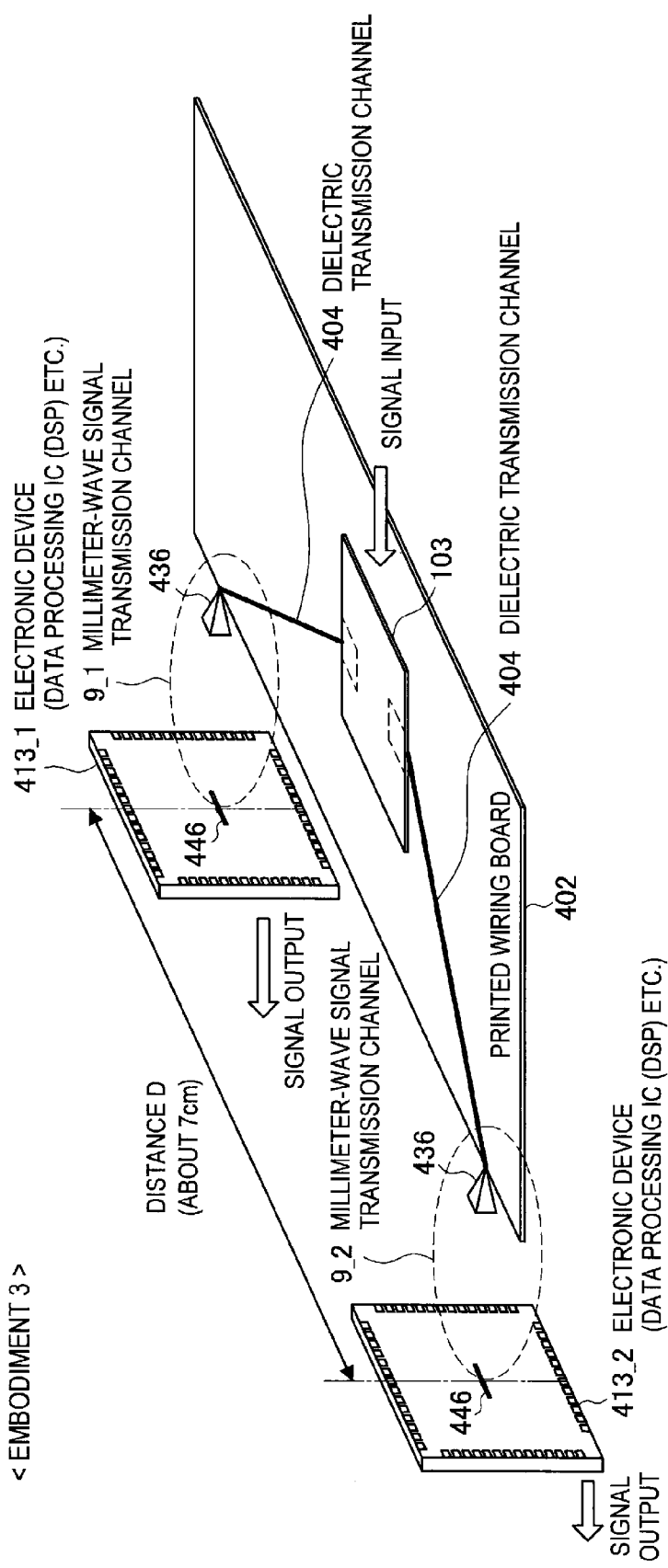
FIG. 17 is a diagram describing Embodiment 8.

FIG. 17 is a diagram describing Embodiment 8. Embodiment 8 shows a case where signals output from a single semiconductor chip 103 are transmitted to a plurality of points on the reception side, which is a variation in which the transmission system and the reception system in Embodiment 3 are interchanged. Signal distribution in which signals of each system are distributed to a plurality of (two) processing circuits, signal switching in which a signal of each system is selectively input to any of a plurality of (two) processing circuits, or signal switching in which any of signals of a plurality of (two) systems is input to a single processing circuit is performed. A plurality of signals with different properties can be acquired on the basis of signals from a single semiconductor chip 103. As a whole, signal distribution or signal switching using radio communication are realized. As a variation, units up to and including the signal generation unit 107 of the transmission system can be arranged near the transmission antenna 436.

Embodiment 9

Figure 18:
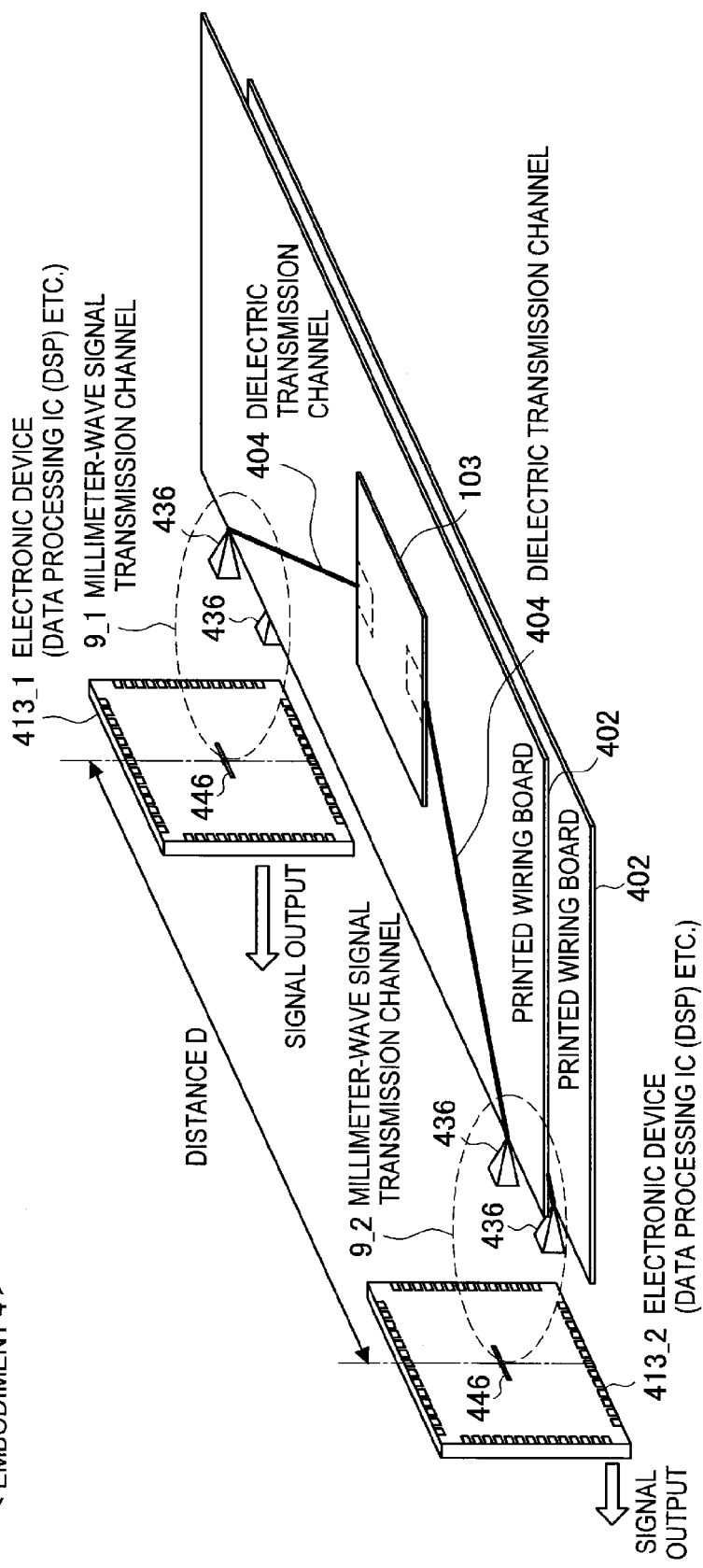
FIG. 18 is a diagram describing Embodiment 9.

FIG. 18 is a diagram describing Embodiment 9. Embodiment 9 shows a case where a plurality of pairs of configurations are provided in each of which signals output from a single semiconductor chip 103 are transmitted to a plurality of points on the reception side, which is a variation in which the transmission system and the reception system in Embodiment 4 are interchanged. Accordingly, a plurality of signals with different properties can be acquired on the basis of signals from two semiconductor chips 103.

Embodiment 10

Figure 19:
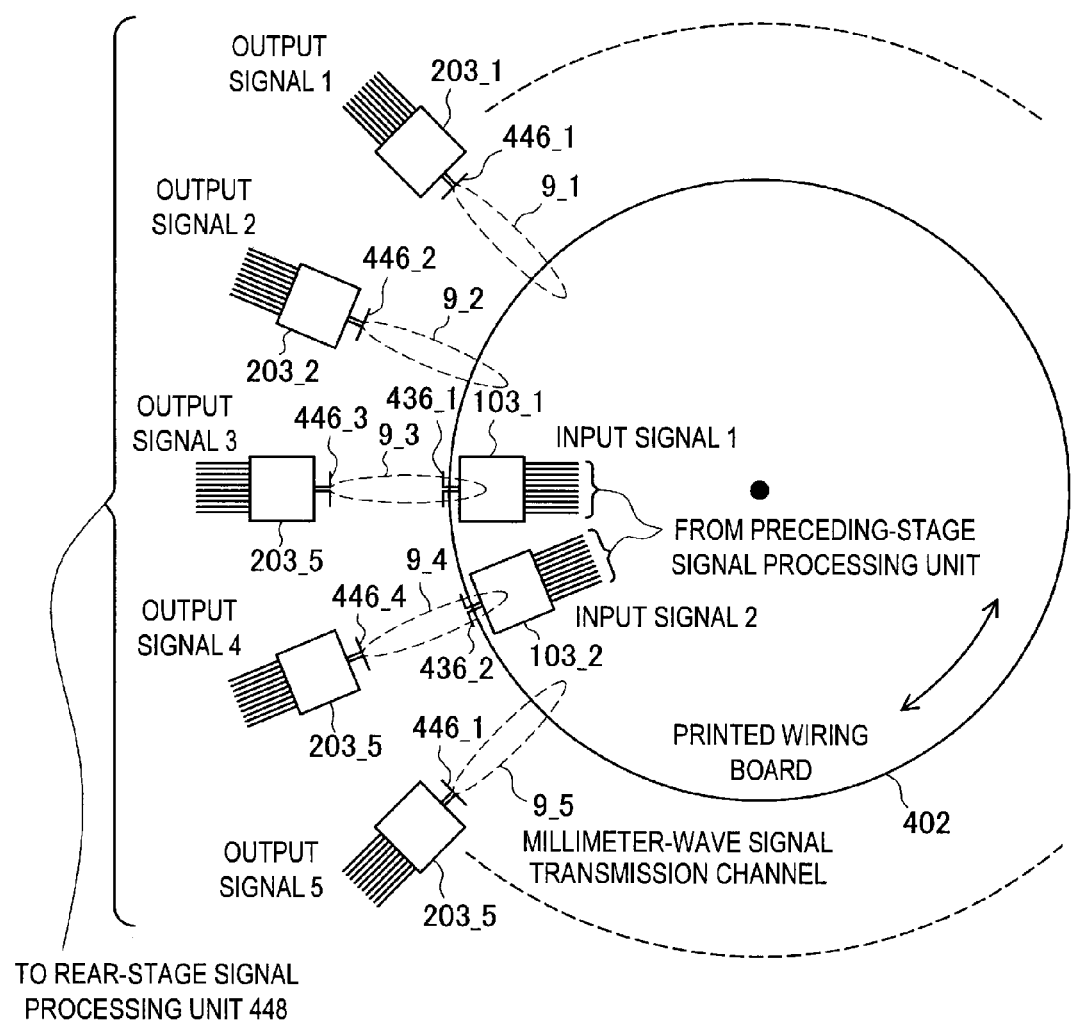
FIG. 19 is a diagram describing Embodiment 10.

FIG. 19 is a diagram describing Embodiment 5. Embodiment 5 shows a configuration in which transmission antennae 436 and reception antennae 446 are moved relative to each other, whereby switching of a received signal is realized, which is a variation in which the transmission system and the reception system in Embodiment 5 are interchanged.

As shown in FIG. 19, a pair of a reception antenna 446 and a semiconductor chip 203 is arranged at about regular intervals around the entire circumference of a circular printed wiring board 402 (FIG. 19 shows five: "_1" to "_5"). Inside the circumference, a single set, which includes a pair of a transmission antenna 436_1 and a semiconductor chip 103_1 and a pair of a transmission antenna 436_2 and a semiconductor chip 103_2, is arranged opposite the two adjacent reception antennae 446 (FIG. 19 shows two: "_3" and "_4") among the plurality of reception antennae 446 arranged along the circumference of the printed wiring board 402. Even when addition of a reception point is required, addition of the reception point can be realized as long as a pair of a semiconductor chip 203 (including a signal generation unit 207 and a transmission channel coupling unit 208) and a reception antenna 446 can be arranged without interference or crosstalk of the electromagnetic wave transmission channel.

The reception side is designed as a stationary unit and the transmission side is designed as a movable unit capable of rotating in an endless manner. Such a configuration makes it possible to sequentially switch a pair of adjacent reception antennae 446 and causing them to receive wireless signals radiated from a pair of transmission antennae 436 within the transmission coverage (receivable ranges) formed by the respective reception antennae 446. In other words, the transmission coverage (the millimeter-wave signal transmission channels 9) formed by the transmission antennae 436 realizes switching of the electromagnetic transmission channels that are received upon movement of the aerials on the transmission unit side, which are arranged on the rotating printed wiring board, as well as the transmission units.

Embodiment 11

Embodiment 11 shows an example in which signal distribution or signal switching that uses radio communication in each of the aforementioned embodiments is applied to an electronic device. Three representative examples are shown below.

First Example

FIG. 20 are diagrams each describing a first example of an electronic device of Embodiment 11. The first example is an application example in which signal transmission is performed wirelessly within a housing of a single electronic device. As an electronic device, an example of application to an imaging device on which a solid-state imaging device is mounted is shown. This type of imaging device is circulated in the market as a digital camera, a video camera (camcoder), a camera (Web camera) of a computer device, or the like, for example.

The device has a configuration in which a first communication device is mounted on a main substrate on which a control circuit, an image processing circuit, and the like are mounted, while a second communication device is mounted on an imaging substrate (a camera substrate) on which a solid-state imaging device is mounted.

Within a housing 590 of an imaging device 500, an imaging substrate 502 and a main substrate 602 are arranged. A solid-state imaging device 505 is mounted on the imaging substrate 502. For example, this corresponds to a case where the solid-state imaging device 505 is a CCD (Charge Coupled Device) and its driving unit (including a horizontal driver and a vertical driver) is also mounted on the imaging substrate 502, or a case where the solid-state imaging device 505 is a CMOS (Complementary Metal-oxide Semiconductor) sensor.

A semiconductor chip 103 is mounted on the main substrate 602, and a semiconductor chip 203 is mounted on the imaging substrate 502. Though not shown, not only the solid-state imaging device 505, but also a peripheral circuit such as an imaging driving unit is mounted on the imaging substrate 502, while an image processing engine, an operation unit, various sensors, and the like are mounted on the main substrate 602.

Functions that are equivalent to the functions of a transmission chip and a reception chip are embedded in each of the semiconductor chip 103 and the semiconductor chip 203. By embedding both the functions of the transmission chip and the reception chip, it becomes possible to support two-way communication.

The solid-state imaging device 505 and the imaging driving unit correspond to an application functional unit of an LSI functional unit on the first communication device side. The LSI functional unit is connected to a signal generation unit on the transmission side, and is further connected to an antenna 236 (a reception point) via a transmission channel coupling unit. The signal generation unit and the transmission channel coupling unit are accommodated within a different semiconductor chip 203 from that of the solid-state imaging device 505, and is mounted on the imaging substrate 502.

The image processing engine, the operation unit, various sensors, and the like correspond to an application functional unit of an LSI functional unit on the second communication device side, and accommodates an image processing unit that processes image signals obtained by the solid-state imaging device 505. The LSI functional unit is connected to a signal generation unit on the reception side, and is further connected to an antenna 136 (a transmission point) via a transmission channel coupling unit. The signal generation unit and the transmission channel coupling unit are accommodated within a different semiconductor chip 103 from that of the image processing engine, and is mounted on the main substrate 602.

The signal generation unit on the transmission side includes a multiplexing processing unit, a parallel-serial conversion unit, a modulation unit, a frequency conversion unit, an amplifier unit, and the like, for example, while the signal generation unit on the reception side includes an amplifier unit, a frequency conversion unit, a demodulation unit, a serial-parallel conversion unit, a demultiplexing processing unit, and the like, for example. Such points also hold true for the other examples described below.

When radio communication is performed between the antenna 136 and the antenna 236, an image signal acquired by the solid-state imaging device 505 is transmitted to the main substrate 602 via the wireless signal transmission channel 9 between the antennae. A configuration that supports two-way communication can also be used. In such a case, for example, a reference clock and various control signals for controlling the solid-state imaging device 505 are transmitted to the imaging substrate 502 via the wireless signal transmission channel 9 between the antennae.

In each of FIG. 20(A) and FIG. 20(B), two systems of millimeter-wave signal transmission channels 9 are provided. FIG. 20(A) shows free-space transmission channels 9B, while FIG. 20(B) shows hollow waveguides 9L. It is acceptable as long as the hollow waveguides 9L each have a hollow structure in which the waveguide is surrounded by a shielding material and the inside of the waveguide is hollow. For example, a structure in which the waveguide is surrounded by a conductor MZ, which is an exemplary shielding material, and the inside of the waveguide is hollow is used. For example, an enclosure of the conductor MZ is fixed on the main substrate 602 such that it surrounds the antenna 136. The center of movement of the antenna 236 on the imaging substrate 502 side is arranged so that it is opposite the antenna 136. As the inside of the conductor MZ is hollow, it is not necessary to use a dielectric material, and thus the millimeter-wave signal transmission channels 9 can be easily formed at low cost.

Herein, in order to support signal distribution from the solid-state imaging device 505, a plurality of antennae 136 (aerials on the reception unit side), signal generation units 207, and LSI functional units 204 are arranged on the reception side (on the main substrate 602 side in this example) for each system as in Embodiment 1, whereby it is possible to perform signal distribution, signal collection in which signals from the two transmission antennae 236 are wirelessly transmitted to a single reception antenna 136, signal switching that uses communication channels between the two transmission/reception systems, and the like.

Although the basic operation of each system is similar to the operation of a single system, the shorter the distance between the systems (the channel-to-channel distance: the distance between the two transmission antennae in this example), the closer the respective millimeter-wave signal transmission channels 9. Thus, in the case of FIG. 20(A), when communication is concurrently performed in each system using the same carrier frequency, there is a possibility that a problem of interference or crosstalk would arise on the reception side. When it is difficult to adjust the arrangement of the antennae (aerials) on the transmission side, the intensity of electromagnetic waves output from the antennae on the transmission side, and the arrangement of the antennae on the reception side, the channel-to-channel distance is short, and it is also difficult to avoid interference and crosstalk of the electromagnetic wave transmission channels, it is preferable to arrange an electromagnetic-wave shielding material (a conductor MZ: metal or the like) between the two millimeter-wave signal transmission channels. Alternatively, a frequency division multiplexing method can be adopted in which the two millimeter-wave signal transmission channels 9 use different frequency bands.

For example, in a signal processing device having a solid-state imaging device such as a digital still camera, a camera for a camcoder, or the like, image data from the solid-state imaging device is transmitted at high speed. For high-speed transmission, electrical signals are used, and many are transmitted to a signal processor using a flexible wiring board, a printed wiring board, a cable, or the like. However, when signal distribution or signal switching is performed, the aforementioned problem with the signal transmission by electrical signals would also arise. In contrast, in Embodiment 11 (first example), a signal to be transmitted is transmitted as a wireless signal, and signal distribution or signal switching is realized at the portion of the wireless signal. As a portion where electrical wire signal transmission is performed is not provided at a portion where signal distribution or signal switching is realized, the signal distribution or signal switching can be performed with a simple configuration. A signal output from a solid-state imaging device has a large volume and high speed. Transmission by electrical wires could increase, in addition to its design difficulty, the design time and cost when branching or distribution of a transmission channel is needed as it is realized using a circuit (e.g., an integrated circuit). In contrast, in Embodiment 11 (first example), distribution or switching is performed under wireless signal conditions using a millimeter-wave electromagnetic transmission channel. Thus, the aforementioned problem can be eliminated.

Second Example

FIG. 21 are diagrams each describing a second example of an electronic device of Embodiment 11. The second example is an application example in which signal transmission is performed wirelessly between electronic devices in a state in which a plurality of electronic devices are integrated. In particular, the second example is applied to signal transmission between two electronic devices when one electronic device is mounted on the other electronic device.

For example, there is known a card-type information processing device typified by a so-called IC card or memory card, which incorporates a central processing unit (CPU), a non-volatile memory device (e.g., flash memory), and the like, designed to be mountable on (detachable from) an electronic device on the main body side. A card-type information processing device, which is an example of one of (first) the electronic devices, will also be referred to as a "card-type device" hereinafter. The other (second) electronic device on the main body side will also be simply referred to as an electronic device hereinafter.

FIG. 21(A) shows an exemplary structure (a perspective plan view and a perspective cross-sectional view) of a memory card 201B. FIG. 21(B) shows an exemplary structure (a perspective plan view and a perspective cross-sectional view) of an electronic device 101B. FIG. 21(C) shows an exemplary structure (a perspective cross-sectional view) when the memory card 201B is inserted into a slot structure 4 (in particular, an opening 192).

The slot structure 4 is configured such that the memory card 201B (a housing 290 thereof) is able to be inserted and removed through the opening 192 and be fixed on a housing 190 of the electronic device 101B. Connectors 180 on the reception side are provided at positions of the slot structure 4 contacting terminals of the memory card 201B. As for signals replaced by radio transmission, connector terminals (connector pins) are not needed.

As shown in FIG. 21(A), the housing 290 of the memory card 201B is provided with a cylindrical recessed structure 298 (a dent), and as shown in FIG. 21(B), the housing 190 of the electronic device 101B is provided with a cylindrical projecting structure 198 (a protrusion). The memory card 201B has a plurality of (two in FIG. 21(A)) semiconductor chips 203 on one surface of a substrate 202, and a plurality of (two in FIG. 21(A)) antennae 236 (a total of two antennae 236) are formed on one surface of the substrate 202. In the housing 290, the recessed structure 298 is formed on the same plane as each antenna 236, and a portion of the recessed structure 298 is formed of a dielectric resin containing a dielectric material capable of transmitting wireless signals.

On one side of the substrate 202, connection terminals 280 for connection to the electronic device 101B are provided at determined positions at determined points of the housing 290. The memory card 201B partly includes a conventional terminal structure for low-speed, small-volume signals and for power supply. For signals to be transmitted using millimeter waves, the terminals are removed as shown by dashed lines in FIG. 21.

As shown in FIG. 21(B), the electronic device 101B has a semiconductor chip 103 on the surface of a substrate 102 having the opening 192, and an antenna 136 is formed on one surface of the substrate 102. In the housing 190, the opening 192 through which the memory card 201B is inserted and removed is formed as the slot structure 4. In the housing 190, the projecting structure 198 having a millimeter-wave confining structure (a waveguide structure) is formed at a portion corresponding to the position of the recessed structure 298 when the memory card 201B is inserted through the opening 192, and thus forms a dielectric transmission channel 9A.

As shown in FIG. 21(C), the housing 190 of the slot structure 4 has a mechanical structure such that in response to insertion of the memory card 201B through the opening 192, the projecting structure 198 (the dielectric transmission channel 9A) and the recessed structure 298 become in projection/recessed contact with each other. When the projecting/recessed structures mate each other, the antenna 136 and the plurality of (two in FIG. 21(C)) antennae 236 are opposite each other, and the dielectric transmission channel 9A is arranged therebetween as the wireless signal transmission channel 9. Accordingly, it is possible to perform, for example, signal distribution in which identical signals from the single transmission antenna 136 are wirelessly transmitted to the two reception antennae 236, signal collection in which signals from the two transmission antennae 236 are wirelessly transmitted to the single reception antenna 136, signal switching that uses communication channels between the two transmission/reception systems, and the like. Although the memory card 201B has the housing 290 interposed between the dielectric transmission channel 9A and the antennae 236, it does not have significant influence on the radio transmission in a millimeter-wave band as the portion of the recessed structure 298 is formed of a dielectric material.

Third Example

FIG. 22 are diagrams each describing a third example of an electronic device of Embodiment 11. The signal transmission device 1 includes a portable image reproducing device 201K as an example of a first electronic device and an image acquisition device 101K as an example of a second (main body side) electronic device on which the image reproducing device 201K is mounted. In the image acquisition device 101K, a mounting support 5K on which the image reproducing device 201K is mounted is provided on a part of a housing 190. Note that instead of the mounting support 5K, the slot structure 4 can be provided as in the second example. The third example is the same as the second example in that signal transmission is performed wirelessly between two electronic devices when one electronic device is mounted on the other electronic device. Hereinafter, description will be made with the difference from the second example being focused.

The image acquisition device 101K is approximately rectangular (box) in shape, and thus cannot be called a card type any more. The image acquisition device 101K can be anything as long as it acquires moving image data, for example, and corresponds to a digital recording/reproducing device or a terrestrial television receiver, for example. The image reproducing device 201K includes, as an application functional unit, a storage device for storing moving image data transmitted from the image acquisition device 101K side and a functional unit for reading the moving image data from the storage device and reproducing a moving image on a display unit (e.g., a liquid crystal display device or an organic EL display device). Structurally, the memory card 201B can be considered to be replaced by the image reproducing device 201K and the electronic device 101B can be considered to be replaced by the image acquisition device 101K.

Within the housing 190 at the bottom of the mounting support 5K, a semiconductor chip 103 is accommodated as in the second example (FIG. 21), for example, and an antenna 136 is provided at a given position. At a portion of the housing 190 opposite the antenna 136, a dielectric transmission channel 9A is formed using a dielectric material as a wireless signal transmission channel 9. Within a housing 290 of the image reproducing device 201K mounted on the mounting support 5K, a plurality of (two in FIG. 22) semiconductor chips 203 are accommodated as in the second example (FIG. 21), for example, and antennae 236 (a total of two antennae 236) are provided corresponding to the respective semiconductor chips 203. At a portion of the housing 290 opposite the two antennae 236, a wireless signal transmission channel 9 (the dielectric transmission channel 9A) is formed using a dielectric material. Such points are similar to those in the second example. Accordingly, it is possible to perform, for example, signal distribution in which identical signals from the single transmission antenna 136 are wirelessly transmitted to the two reception antennae 236, signal collection in which signals from the two transmission antennae 236 are wirelessly transmitted to the single reception antenna 136, signal switching that uses communication channels between the two transmission/reception systems, and the like.

The third example adopts not the concept of a mating structure but a wall-butting method so that the antenna 136 and the antennae 236 are located opposite each other when the image acquisition device 101K is put such that it butts against the edge 101a of the mounting support 5K. Thus, influence of misalignment can be surely eliminated. Such a configuration allows alignment of the image reproducing device 201K to be performed for wireless signal transmission when the image reproducing device 201K is mounted on (attached to) the mounting support 5K. Although the housing 190 and the housing 290 are interposed between the antenna 136 and the antennae 236, they have no significant influence on the radio transmission in a millimeter-wave band as they are made of dielectric materials.

REFERENCE SIGNS LIST

1 Signal transmission device
100 First communication device
102 Substrate
103 Semiconductor chip
104 LSI functional unit
107 Signal generation unit
108 Transmission channel coupling unit
110 Signal generation unit on the transmission side
113 Multiplexing processing unit
114 Parallel-serial conversion unit
115 Modulation unit
116 Frequency conversion unit
117 Amplifier unit
120 Signal generation unit on the reception side
124 Amplifier unit
125 Frequency conversion unit
126 Demodulation unit
127 Serial-parallel conversion unit
128 Demultiplexing processing unit
132 Millimeter-wave transmission/reception terminal
134 Millimeter-wave transmission channel
136 Antenna
142 Dielectric waveguide
144 Conductor (Shielding material)
174 Power supply millimeter-wave conversion unit
176 Time-division processing unit
200 Second communication unit
201 Memory card
202 Substrate
203 Semiconductor chip

207 Signal generation unit
208 Transmission channel coupling unit
236 Antenna
4 Slot Structure
9 Millimeter-wave signal transmission channel
9A Dielectric transmission channel
9B Free-space transmission channel
9L Hollow waveguide

The invention claimed is:

1. An electronic device, comprising:
a transmission unit that transmits a signal to be transmitted as a wireless signal; and
a reception unit that receives the wireless signal transmitted from the transmission unit, the transmission unit and the reception unit being arranged within a housing, wherein,
   a wireless signal transmission channel that allows radio transmission is formed between a transmission point in the transmission unit and a reception point in the reception unit,
   a plurality of communication channels can be formed between transmission point(s) and reception point(s) within the wireless signal transmission channel,
   the electronic device is configured to execute signal distribution in which identical signals to be transmitted are distributed to a plurality of reception units by transmitting identical wireless signals from a single transmission point to a plurality of reception points using the plurality of communication channels, and
a gap between the transmission point(s) and the reception point(s) is set within a range that the identical wireless signals to be transmitted from the single transmission point can be concurrently received at the plurality of reception points, or within a range that a plurality of signals to be transmitted can be concurrently received at a single reception point.

2. The electronic device according to claim 1, wherein:
the single transmission point and the plurality of reception points are arranged within the electronic device, and
the identical wireless signals to be transmitted from the single transmission point are transmitted to the plurality of reception points.

3. The electronic device according to claim 1, wherein:
a plurality of transmission points and the plurality of reception points are arranged within the electronic device,
a plurality of independent wireless signal transmission channels can be formed for each transmission point, and
the electronic device is configured to execute the signal distribution in each wireless signal transmission channel.

4. The electronic device according to claim 1, wherein the electronic device is configured such that the plurality of communication channels are concurrently used by applying a multiplexing method.

5. The electronic device according to claim 1, wherein the transmission unit, the reception unit, and the wireless signal transmission channel are arranged at predetermined positions within the housing that is a single housing.

6. The electronic device according to claim 1, further comprising:
a preceding-stage signal processing unit that performs predetermined signal processing on the signal to be transmitted,
a modulation unit that modulates a processed signal output from the preceding-stage signal processing unit and provides the modulated signal to the transmission unit for transmission as the wireless signal to the reception unit,
a demodulation unit that demodulates the wireless signal received by the reception unit, and
a rear-stage signal processing unit that performs predetermined signal processing on the signal demodulated by the demodulation unit.

7. The electronic device according to claim 1, wherein the electronic device is further configured to execute signal switching in which a destination of the signal to be transmitted is switched.

8. The electronic device according to claim 7, wherein a signal transmitted form the transmission point is selectively transmitted to any one of the plurality of reception points arranged within the electronic device.

9. The electronic device according to claim 7, wherein a plurality of transmission points are arranged within the electronic device, and any of signals transmitted from the plurality of transmission points is selectively transmitted to the single reception point.

10. The electronic device according to claim 7, wherein the transmission point and the reception point are configured to be movable relative to each other.

11. The electronic device according to claim 1, wherein the electronic device is further configured to execute signal collection in which the plurality of signals to be transmitted are collected into a single reception unit by transmitting respective wireless signals transmitted from a plurality of transmission points to the single reception point.

12. An electronic device, comprising:
a transmission unit that transmits a signal to be transmitted as a wireless signal; and
a reception unit that receives the wireless signal transmitted from the transmission unit, the transmission unit and the reception unit being arranged within a housing, wherein,
   a wireless signal transmission channel that allows radio transmission is formed between a transmission point in the transmission unit and a reception point in the reception unit,
   a plurality of communication channels can be formed between transmission point(s) and reception point(s) within the wireless signal transmission channel,
   the electronic device is configured to execute signal distribution in which identical signals to be transmitted are distributed to a plurality of reception units by transmitting identical wireless signals from a single transmission point to a plurality of reception points using the plurality of communication channels, and
   a plurality of transmission points are arranged in the transmission unit and a plurality of reception points are arranged in the reception unit, the transmission points and the reception points being able to be paired, wherein signal processing is performed using a signal acquired by each pair.

13. An electronic device, comprising:
a transmission unit that transmits a signal to be transmitted as a wireless signal; and
a reception unit that receives the wireless signal transmitted from the transmission unit, the transmission unit and the reception unit being arranged within a housing, wherein,
   a wireless signal transmission channel that allows radio transmission is formed between a transmission point in the transmission unit and a reception point in the reception unit,
   a plurality of communication channels can be formed between transmission point(s) and reception point(s) within the wireless signal transmission channel, the electronic device is configured to execute signal distribution in which identical signals to be transmitted are distributed to a plurality of reception units by transmitting identical wireless signals from a single transmission point to a plurality of reception points using the plurality of communication channels, and a plurality of transmission points are arranged in the transmission unit and a plurality of reception points are arranged in the reception unit, the transmission points and the reception points being able to be paired, and a reception side of each pair performs signal processing with respect to a different signal property based on a plurality of wireless signals radiated from an identical transmission point and having different properties from each other, to acquire a signal with a different property.

14. The electronic device according to claim 13, wherein the plurality of wireless signals represent three-dimensional image signals having different properties from each other.

15. The electronic device according to claim 14, wherein the different properties include different senses of depth.

* * * * *